(12) United States Patent
Kambara

(10) Patent No.: US 9,967,948 B2
(45) Date of Patent: May 8, 2018

(54) LIGHTING DEVICE, LUMINAIRE, VEHICLE WITH SAME, AND LIGHTING METHOD

(71) Applicant: Panasonic Intellectual Property Management Co., Ltd., Osaka (JP)

(72) Inventor: Takashi Kambara, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days. days.

(21) Appl. No.: 15/677,172

(22) Filed: Aug. 15, 2017

(65) Prior Publication Data

US 2018/0063907 A1    Mar. 1, 2018

(30) Foreign Application Priority Data

Aug. 30, 2016    (JP) .................................. 2016-168429

(51) Int. Cl.
| | |
|---|---|
| H05B 33/08 | (2006.01) |
| F21V 23/02 | (2006.01) |
| H02M 3/335 | (2006.01) |
| F21Y 115/10 | (2016.01) |

(52) U.S. Cl.
CPC ........... *H05B 33/089* (2013.01); *F21V 23/02* (2013.01); *H02M 3/33507* (2013.01); *H05B 33/0815* (2013.01); *H05B 33/0848* (2013.01); *H05B 33/0887* (2013.01); *F21Y 2115/10* (2016.08)

(58) Field of Classification Search
CPC ............ H05B 33/0845; H05B 33/0815; H05B 33/0818; F21S 8/086; F21V 23/009; F21V 23/0464

USPC .............................. 315/77, 87, 224, 308, 291
See application file for complete search history.

(56) References Cited

U.S. PATENT DOCUMENTS

| | | | | |
|---|---|---|---|---|
| 2002/0014862 A1* | 2/2002 | Fregoso | ............. | H05B 33/0803 315/291 |
| 2010/0253302 A1* | 10/2010 | Otte | ...................... | H02M 3/155 323/282 |
| 2010/0327766 A1* | 12/2010 | Recker | .................... | H02J 7/025 315/291 |

(Continued)

FOREIGN PATENT DOCUMENTS

JP    2013-203273 A    10/2013

*Primary Examiner* — Douglas W Owens
*Assistant Examiner* — Syed M Kaiser
(74) *Attorney, Agent, or Firm* — Renner Otto Boisselle & Sklar, LLP

(57) ABSTRACT

A lighting device includes a current outputter, a load characteristic obtainer and a controller. The current outputter is configured to supply a current to a light source of at least one light source unit. The load characteristic obtainer is configured to obtain load information from a corresponding load information outputter of the at least one light source unit, by supplying the electric power to the load information outputter. The controller is configured to control the current of the current outputter, which is supplied to the light source, based on the load information. The load characteristic obtainer is configured to supply the electric power to the corresponding load information outputter only during a time period of obtaining the load information, but stop supply of the electric power to the corresponding load information outputter during a time period other than the time period of obtaining the load information.

18 Claims, 12 Drawing Sheets

(56) References Cited

U.S. PATENT DOCUMENTS

| | | | |
|---|---|---|---|
| 2010/0327835 A1* | 12/2010 | Archibald | H05B 33/0818 323/282 |
| 2011/0025227 A1* | 2/2011 | Chida | H03F 1/301 315/291 |
| 2011/0133655 A1* | 6/2011 | Recker | H02J 9/02 315/159 |
| 2013/0181630 A1* | 7/2013 | Taipale | H05B 37/0263 315/224 |
| 2013/0257272 A1 | 10/2013 | Ishii | |
| 2014/0253032 A1* | 9/2014 | Bruwer | H02M 1/36 320/108 |
| 2014/0265893 A1* | 9/2014 | Melanson | H05B 33/0806 315/192 |
| 2014/0312796 A1* | 10/2014 | Sauerlander | H05B 33/0815 315/210 |
| 2016/0181911 A1* | 6/2016 | Knauss | G01R 19/16538 315/209 R |
| 2016/0360589 A1* | 12/2016 | Neudorf | H05B 33/0815 |

\* cited by examiner

LIGHTING DEVICE, LUMINAIRE, VEHICLE WITH SAME, AND LIGHTING METHOD

CROSS-REFERENCE TO RELATED APPLICATION

This application is based upon and claims the benefit of priority of Japanese Patent Application No. 2016-168429, filed on Aug. 30, 2016, the entire content of which is incorporated herein by reference.

TECHNICAL FIELD

This disclosure relates to lighting devices, luminaires, vehicles with the same and lighting methods and, more particularly, to a lighting device causing a semiconductor light source to emit light, a luminaire, a vehicle with the same, and a lighting method.

BACKGROUND ART

Conventionally, there has been a vehicle luminaire that includes a power converter for converting DC power, which is inputted thereto, and supplying its output current to a Light Emitting Diode (LED) (refer to a Document 1: JP 2013-203273). Regarding the LED which is a load for the power converter, there is a variation in a light output characteristic (luminous characteristic) with respect to a drive current among products. For this reason, the luminous characteristic of the LED is previously ranked, and the LED is provided with an output current setting device that includes a resistor having a resistance value which is made associated with a rank thereof. The vehicle luminaire divides a voltage supplied from a constant voltage source, using a voltage dividing resistor and the output current setting device, and an output controller controls an output of the power converter in accordance with a divided voltage.

In the above-mentioned vehicle luminaire, the voltage from the constant voltage source is continuously applied to a series circuit formed by the voltage dividing resistor and the output current setting device. Accordingly, there is a problem that current consumption is increased, depending on a current flowing through the series circuit.

SUMMARY

The present disclosure is directed to a lighting device, a luminaire, a vehicle with the same, and a lighting method, which can reduce power consumption.

A lighting device according to an aspect of the present disclosure is to cause at least one light source unit to emit light. Each of the at least one light source unit includes a light source and a corresponding load information outputter for outputting load information when electric power is supplied thereto. The load information represents a luminous characteristic of the light source. The lighting device includes at least one current outputter, a load characteristic obtainer and a controller. The at least one current outputter is configured to supply a current to the light source of the at least one light source unit. The load characteristic obtainer is configured to obtain the load information from the corresponding load information outputter of the at least one light source unit, by supplying the electric power to the load information outputter. The controller is configured to control the current of the at least one current outputter, which is supplied to the light source of the at least one light source unit, based on the load information obtained by the load characteristic obtainer. The load characteristic obtainer is configured to supply the electric power to the corresponding load information outputter only during a time period of obtaining the load information, but stop supply of the electric power to the corresponding load information outputter during a time period other than the time period of obtaining the load information.

A luminaire according to an aspect of the present disclosure includes the lighting device and a luminaire body holding the lighting device.

A vehicle according to an aspect of the present disclosure includes the luminaire and a vehicle body to which the luminaire is attached.

A lighting method according to an aspect of the present disclosure is to cause at least one light source unit to emit light. Each of the at least one light source unit includes a light source and a corresponding load information outputter for outputting load information when electric power is supplied thereto. The load information represents a luminous characteristic of the light source. The lighting method includes: supplying a current to the light source of the at least one light source unit; obtaining the load information from the corresponding load information outputter of the at least one light source unit, by supplying the electric power to the load information outputter; controlling the current of the at least one current outputter, which is supplied to the light source of the at least one light source unit, based on the load information obtained; and supplying the electric power to the corresponding load information outputter only during a time period of obtaining the load information, but stopping supply of the electric power to the corresponding load information outputter during a time period other than the time period of obtaining the load information.

A lighting device according to an aspect of the present invention is to cause at least one light source unit to emit light. Each of the at least one light source unit includes a light source and a corresponding temperature probe. The lighting device includes at least one current outputter, a temperature obtainer and a controller. The at least one current outputter is configured to supply a current to the light source of the at least one light source unit. The temperature obtainer is configured to obtain a measuring value of a temperature from the corresponding temperature probe, by supplying power to the temperature probe. The controller is configured to control the current of the at least one current outputter, which is supplied to the light source of the at least one light source unit, based on the measuring value of the temperature obtained by the temperature obtainer. The temperature obtainer is configured to supply the power to the corresponding temperature probe only during a time period of obtaining the measuring value of the temperature, but stop supply of the power to the corresponding temperature probe during a time period other than the time period of obtaining the measuring value of the temperature.

BRIEF DESCRIPTION OF THE DRAWINGS

The figures depict one or more implementations in accordance with the present disclosure, by way of example only, not by way of limitations. In the figures, like reference numerals refer to the same or similar elements.

DETAILED DESCRIPTION

Embodiments explained below are merely examples. The present disclosure is not limited to the following embodiments, but may include embodiments other than the following embodiments. In the following embodiments, numerous modifications and variations can be made according to designs and the like without departing from the technical ideas according to the present disclosure.

First Embodiment (1. 1) Configuration

Figure 1:
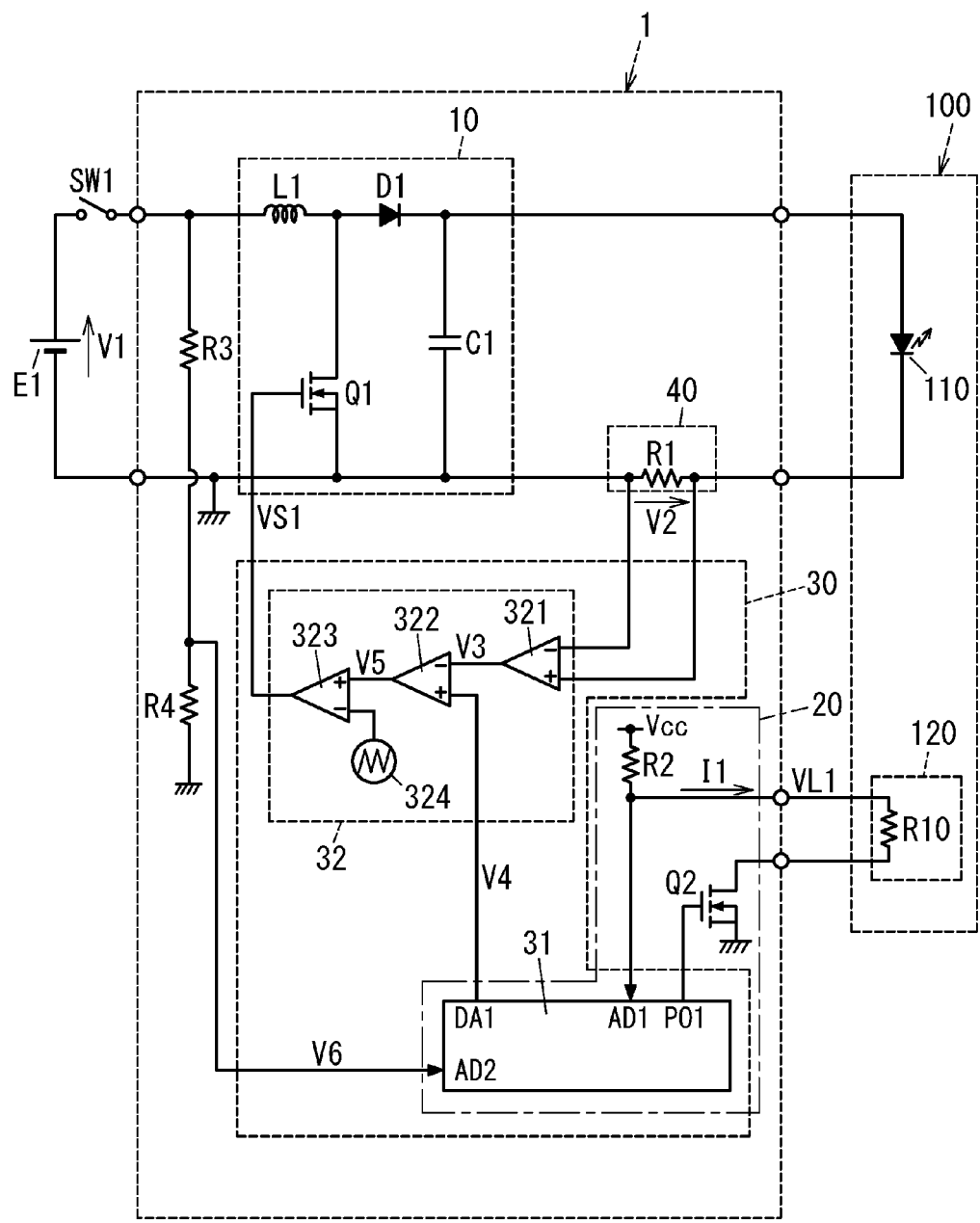
FIG. 1 is a circuit diagram of a lighting device according to a First Embodiment of the present disclosure.

As shown in FIG. 1, a lighting device 1 according to a First Embodiment is used for causing a light source unit 100 to emit light. The lighting device 1 of this embodiment is used for causing the light source unit 100, installed to a vehicle such as an automobile, to emit light.

First, the light source unit 100, which is a load for the lighting device 1, will be described.

The light source unit 100 includes a light source 110 and a load information outputter 120. The light source 110 includes a semiconductor light-emitting element(s) such as a Light Emitting Diode(s) (LED). The load information outputter 120 outputs load information representing a luminous characteristic of the light source 110, when electric power is supplied to the load information outputter 120.

The light source 110 includes e.g., LEDs, which are connected in series or in parallel.

The load information outputter 120 includes e.g., a resistor R10. The light source 110 is previously classified into one of a plurality of levels (e.g., five levels), based on its luminous characteristic (luminous flux rank), and the resistor R10 of the load information outputter 120 has a resistance value, which is previously determined based on the classified level. For example, in manufacturing of light source units 100 or the like, the luminous characteristic of each light source 110 is determined, and the resistor R10 with the resistance value corresponding to the luminous characteristic is installed in the load information outputter 120 of each light source unit 100.

When a constant DC voltage is applied to a series circuit formed by the load information outputter 120 and a voltage dividing resistor (resistor R2), namely, electric power is supplied to the load information outputter 120, a voltage is generated across the resistor R10, depending on the resistance value thereof. The voltage has a value corresponding to the luminous characteristic of the light source 110, namely, the value of the voltage is the load information. The "load information" mentioned herein means information corresponding to the luminous characteristic of the light source 110. The luminous characteristic of the light source 110 can be therefore specified, using the load information. The luminous characteristic of the light source 110 is information that represents, for example, input specification of the light source 110. The input specification of the light source 110 preferably includes information on any one or more of an input current, an input voltage and input power. In this embodiment, the luminous characteristic (load information) of the light source 110 includes information on the input current of the light source 110. An output current of a current outputter 10 described later can be set, using the information on the input current of the light source 110.

The following Table 1 shows a relation between five levels of luminous characteristics (luminous flux ranks), resistance values of resistors R10, and target values of output currents flowing through light sources 110 respectively corresponding to the luminous flux ranks.

TABLE 1

| RANK | RESISTOR R10 (kΩ) | OUTPUT CURRENT (mA) |
| --- | --- | --- |
| 1 | 0.68 | 600 |
| 2 | 1.0 | 700 |
| 3 | 1.5 | 800 |
| 4 | 2.2 | 900 |
| 5 | 3.3 | 1000 |

Next, the lighting device 1 of this embodiment will be described.

As shown in FIG. 1, the lighting device 1 includes a current outputter 10, a load characteristic obtainer 20 and a controller 30. The lighting device 1 of this embodiment further includes an output current detector 40. The lighting device 1 and the light source unit 100 are electrically connected to each other with electric wires and the like.

The current outputter 10 is formed as, for example, a step-up DC-DC converter that includes an inductor L1, a switching element Q1, a diode D1 and a smoothing capacitor C1.

The inductor L1 has a first end connected to a positive electrode of a DC power supply E1 so that a power supply switch SW1 is interposed between the inductor L1 and the DC power supply E1. The DC power supply E1 is, for example, a battery of an automobile, or a power supply circuit using the battery of the automobile as a power source. Alternatively, the DC power supply E1 may be an AC-DC conversion circuit of rectifying and smoothing AC power supplied from an AC power supply and then converting it into DC power.

The switching element Q1 is, for example, a Metal-Oxide-Semiconductor Field-Effect Transistor (MOSFET). The switching element Q1 has: a drain electrode connected to a second end of the inductor L1; a source electrode connected to a negative electrode of the DC power supply E1; and a gate electrode for receiving a drive signal VS1 from the controller 30.

The diode D1 has an anode connected to a connecting point between the inductor L1 and the switching element Q1.

The smoothing capacitor C1 is connected between a cathode of the diode D1 and the source electrode of the switching element Q1. A series circuit formed by the light source 110 and a resistor R1 (output current detector 40) is connected across the smoothing capacitor C1.

The load characteristic obtainer 20 is constituted by the resistor R2, a switch element Q2 and a microcomputer 31. The resistor R2 has a first end to which a DC voltage Vcc is applied, and a second end connected to a first end of the resistor R10. The switch element Q2 is, for example, a MOSFET. The switch element Q2 has: a drain electrode connected to a second end of the resistor R10; a source electrode connected to the ground of circuit; and a gate electrode connected to an output port PO1 of the microcomputer 31, described later.

As one example, the following Table 2 shows a relation between values of a divided voltage VL1 and values of a current I1 flowing through a series circuit formed by the resistors R2 and R10 in the luminous flux ranks, where the resistor R2 has a resistance value of 1 kΩ and the DC voltage Vcc with a voltage value of 5V is applied to the series circuit formed by the resistors R2 and R10.

TABLE 2

| RANK | DIVIDED VOLTAGE VL1 (V) | CURRENT I1 (mA) |
|---|---|---|
| 1 | 2.02 | 2.976 |
| 2 | 2.50 | 2.500 |
| 3 | 3.00 | 2.000 |
| 4 | 3.44 | 1.563 |
| 5 | 3.84 | 1.163 |

In this embodiment, a range of values which the divided voltage VL1 can obtain each luminous flux rank (hereinafter referred to as a "determination range") is previously set based on the values of the divided voltage VL1 respectively corresponding to the luminous flux ranks. The following Table 3 shows a relation between determination ranges of the divided voltage VL1 and target values of the output current in the luminous flux ranks. The microcomputer 31 of the controller 30 has a memory previously storing information (data) on that the determination ranges of the divided voltage VL1 are respectively made associated with the target values of the output current in the luminous flux ranks (refer to Table 3). The memory of the microcomputer 31 may previously store the data as shown in the Tables 1 and 2.

TABLE 3

| RANK | DETERMINATION RANGE (V) | OUTPUT CURRENT (mA) |
|---|---|---|
| 1 | 1.75 to 2.26 | 600 |
| 2 | 2.26 to 2.75 | 700 |
| 3 | 2.75 to 3.22 | 800 |
| 4 | 3.22 to 3.64 | 900 |
| 5 | 3.64 to 4.15 | 1000 |

The output current detector 40 includes the resistor R1 connected in series to the light source 110.

The controller 30 includes the microcomputer 31 and a drive signal generating circuit (DSGC) 32.

The microcomputer 31 includes a Central Processing Unit (CPU) and the memory. The CPU executes a program(s) stored in the memory, thereby the following functions and the like being realized: a function of obtaining the load information from the load information outputter 120; a function of determining the luminous characteristic of the light source 110, using the load information; and a function of controlling the output of the current outputter 10 in accordance with the luminous characteristic of the light source 110. The microcomputer 31 has: the output port PO1 connected to the gate electrode of the switch element Q2; an analog input port AD1 to which a voltage at a connecting point between the resistors R2 and R10 is input; an analog input port AD2 to which a voltage V6 is input; and an analog output port DA1. The voltage V6 is a voltage obtained by an input voltage V1 being divided by resistors R3 and R4.

The drive signal generating circuit 32 includes an amplifier 321, an error arithmetic part 322, a comparator 323 and an oscillation circuit 324.

The amplifier 321 is, for example, an operational amplifier and to amplify a voltage V2 generated across the resistor R1.

The error arithmetic part 322 is, for example, an operational amplifier and to output an error voltage between an output voltage V3 of the amplifier 321 and a target voltage V4 output from the analog output port DA1 of the microcomputer 31.

The oscillation circuit 324 is configured to generate a triangular wave with a prescribed frequency.

The comparator 323 has a positive input terminal connected to an output terminal of the error arithmetic part 322. The comparator 323 further has a negative input terminal connected to an output terminal of the oscillation circuit 324. The comparator 323 further has an output terminal connected to the gate electrode of the switching element Q1.

(1. 2) Explanation of Operation

Figure 2:
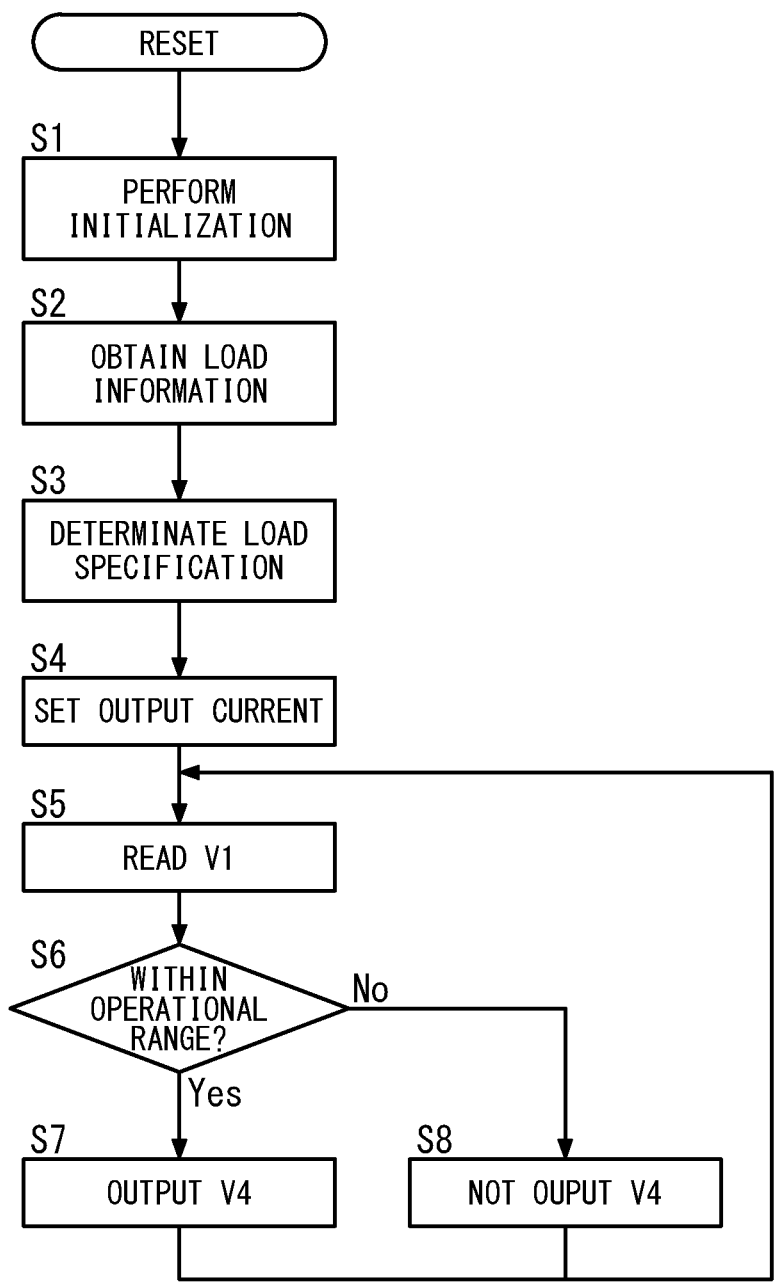
FIG. 2 is a flowchart for explaining operation of the lighting device according to the First Embodiment.

Operation of the lighting device 1 of this embodiment will be explained below with reference to FIG. 2.

When the power supply switch SW1 is turned on in response to an operation of a driver who drives a vehicle or an on-command from an Electronic Control Unit (ECU) of the vehicle, the DC power supply E1 starts supply of electric power to the lighting device 1. Accordingly, the microcomputer 31 starts an initialization process (refer to a Step S1). After the initialization process, the microcomputer 31 performs operation for reading the load information from the load information outputter 120 of the light source unit 100 (refer to a Step S2).

Until starting the operation for reading the load information, the microcomputer 31 keeps a voltage level of the output port PO1 at a Low-level, so that the switch element Q2 is in an off state. In this state, no electric power is supplied into the load information outputter 120. Then upon the operation for reading the load information, the microcomputer 31 switches the voltage level of the output port PO1 to a High-level to make the switch element Q2 in an on state. At this time, the DC voltage Vcc is applied to the series circuit formed by the resistors R2 and R10, and thus the analog input port AD1 of the microcomputer 31 receives the divided voltage VL1 obtained by the DC voltage Vcc being divided by the resistors R2 and R10.

In the on state of the switch element Q2, the microcomputer 31 subjects the divided voltage VL1, input to the analog input port AD1, to an Analog/Digital conversion (A/D conversion) to obtain the divided voltage VL1. After obtaining the divided voltage VL1, the microcomputer 31 switches the voltage level of the output port PO1 to the Low-level to make the switch element Q2 in the off state. Supplying of the electric power to the resistor R10 is accordingly cut off. In this way, the microcomputer 31 supplies the electric power to the load information outputter 120 only during a time period of obtaining the load information, but stops supply of the electric power to the load information outputter 120 during a time period other than the time period of obtaining the load information.

After obtaining the divided voltage VL1, the microcomputer 31 compares a measured value of the divided voltage VL1 with the determination range of the divided voltage VL1 in each luminous flux rank in order to determine a luminous flux rank of the light source 110, namely, load specification of the light source 110 (refer to a Step S3). When succeeding in determination of the luminous flux rank of the light source 110, the microcomputer 31 obtains a setting value of an output current corresponding to the determined luminous flux rank from the memory (refer to a Step S4). If the measured value of the divided voltage VL1 fails to meet any of the determination ranges corresponding to the luminous flux ranks 1 to 5, the microcomputer 31 determines that abnormality occurs in a circuit obtaining the load information from the load information outputter 120, or the like, and cancels a process for setting the target value of the output current.

When succeeding in determination of the luminous flux rank of the light source 110, the microcomputer 31 subjects the voltage V6, input to the analog input port AD2, to an A/D conversion, and then detects the input voltage V1, using a measured value of the voltage V6 (refer to a Step S5). The microcomputer 31 then determines whether or not a detected value of the input voltage V1 is within an operational range (refer to a Step S6). Since the DC power supply E1 uses a battery of the vehicle as a power source, a power supply voltage of the DC power supply E1 may be changed. The microcomputer 31 starts a process for lighting the light source 110, if the detected value of the input voltage V1 is within the operational range.

If the detected value of the input voltage V1 is determined to be within the operational range (the Step S6: Yes), the microcomputer 31 outputs the target voltage V4 corresponding to the setting value of the output current to the positive input terminal of the comparator 323 through the analog output port DA1 (refer to a Step S7).

At this time, in the drive signal generating circuit 32, the amplifier 321 amplifies the voltage V2 generated across the resistor R1, and the error arithmetic part 322 amplifies the error voltage between the output voltage V3 of the amplifier 321 and the target voltage V4 received from the microcomputer 31.

If a voltage value of the triangular wave from the oscillation circuit 324 is equal to or less than the output voltage of the error arithmetic part 322, a voltage level of the output voltage of the comparator 323 is switched to a High-level. On the other hand, if the voltage value of the triangular wave from the oscillation circuit 324 exceeds the output voltage of the error arithmetic part 322, the voltage level of the output voltage of the comparator 323 is switched to a Low-level. Accordingly, the comparator 323 generates the drive signal VS1 that is a Pulse Width Modulation (PWM) signal which of a duty ratio (an on-duty) is increased, as the output voltage V5 of the error arithmetic part 322 is increased, that is, as the error voltage between the voltage V3 and the target voltage V4 is increased. The drive signal generating circuit 32 then outputs the drive signal VS1 to the gate electrode of the switching element Q1. Accordingly, the duty ratio of the switching element Q1 in the current outputter 10 is adjusted, and a current to be supplied to the light source 110 from the current outputter 10 is therefore controlled into the target value of the output current corresponding to the luminous flux rank of the light source 110.

On the other hand, if the detected value of the input voltage V1 is determined to be out of the operational range (the Step S6: No), the microcomputer 31 does not output the target voltage V4 to the drive signal generating circuit 32 so that the output of the current outputter 10 is at a standstill (refer to a Step S8), thereby causing the light source 110 to emit no light.

In this embodiment, the load characteristic obtainer 20 supplies the electric power to the load information outputter 120 only during a time period of obtaining the load information from the light source unit 100, but stops supply of the electric power to the load information outputter 120 during a time period other than the time period of obtaining the load information. It is therefore possible to reduce power consumption. Furthermore, the load characteristic obtainer 20 obtains the load information from the light source unit 100, while the current outputter 10 as a step-up chopper is in non-operation. The load characteristic obtainer 20 can therefore obtain the load information, while influence of noise is reduced. If power consumption in the load characteristic obtainer 20 is increased, it leads to an increase in a power loss or heat generation in a power supply circuit supplying an operational voltage to the load characteristic obtainer 20. However, since the power consumption in the load characteristic obtainer 20 can be reduced in this embodiment, it is possible to suppress the increase in the power loss or the heat generation in the power supply circuit.

During the time period of obtaining the load information, the load characteristic obtainer 20 makes the current I1 of 100 μA or more (in this embodiment, 1 mA or more) flow through the resistor R10 of the load information outputter 120. The load characteristic obtainer 20 and the load information outputter 120 are connected to each other with electric wires, and provided with connectors for connecting the electric wires. If a slight current with a value less than 100 μA flows through contact parts of the connectors or the like, oxide films may be formed on the contact parts, and a contact failure or the like may therefore occur. In this embodiment, since the load characteristic obtainer 20 makes the current I1 of at least 100 μA flow through the resistor R10, the oxide films are hardly formed on the contact parts, even when the lighting device 1 and the light source unit 100 are connected, using the connectors. Accordingly, even when the electric wires connecting the lighting device 1 and the light source unit 100 are connected with the connectors, the contact parts of the connectors do not need to be plated with gold or the like. Reliability of electrical connection between the lighting device 1 and the light source unit 100 can be therefore improved, and noise resistance performance can be also enhanced. Note that, in consideration of suppression of the power consumption and adverse influence due to the slight current, the current supplied to the resistor R10 is preferably in a range from 100 μA to 10 mA, more preferably from 1 mA to 10 mA, while the load characteristic obtainer 20 obtains the load information.

(1. 3) Variations

Hereinafter, variations of the above embodiment will be listed. Note that the variations explained below can be applied in appropriately combination with the above embodiments.

(1. 3. 1) First Variation

Figure 3:
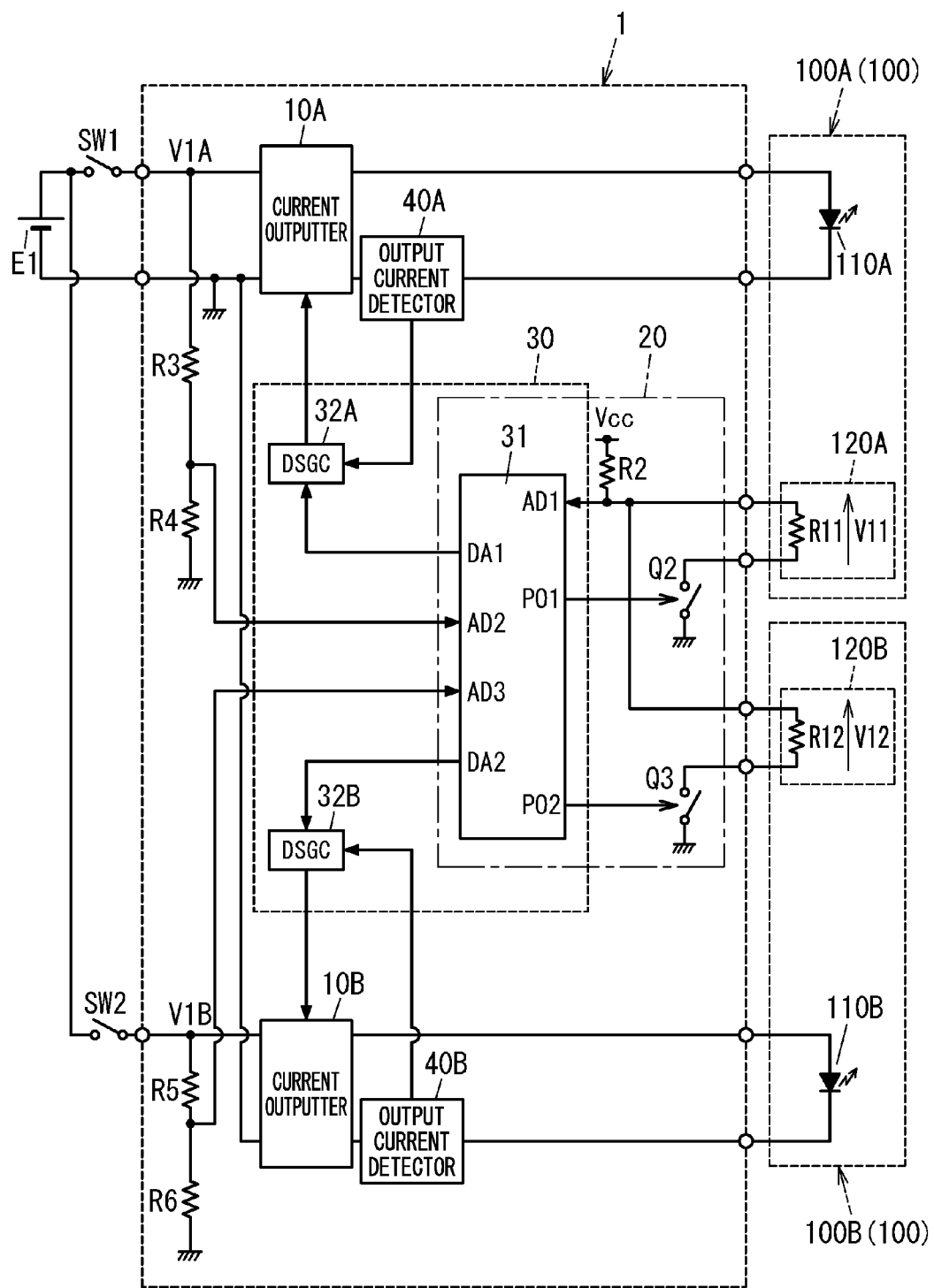
FIG. 3 is a circuit diagram of a First Variation of the lighting device according to the First Embodiment.

FIG. 3 is a circuit diagram of a lighting device 1 according to a First Variation.

In the above embodiment one lighting device 1 causes one light source unit 100 to emit light, but in this First Variation one lighting device 1 causes two light source units 100A and 100B to emit light. Hereinafter, components similar to those of the above Embodiment are denoted by same reference signs and explanations thereof are omitted.

The light source units 100A and 100B respectively include light sources 110A and 110B, each of which includes a semiconductor light-emitting element(s) such as an LED(s). The light source units 100A and 100B further include load information outputters 120A and 120B which are to output load information representing luminous characteristics of the light sources 110A and 110B, when electric power is supplied to the load information outputters 120A and 120B, respectively. The light source 110A includes e.g., LEDs, which are connected in series or in parallel. Also, the light source 110B includes e.g., LEDs, which are connected in series or in parallel. The load information outputter 120A includes a resistor R11 having a resistance value according to a luminous flux rank of the light source 110A. The load information outputter 120B includes a resistor R12 having a resistance value according to a luminous flux rank of the light source 110B.

The lighting device 1 includes current outputters 10A and 10B, a load characteristic obtainer 20, a controller 30, and output current detectors 40A and 40B.

The current outputters 10A and 10B are configured to supply currents to the light source units 100A and 100B, respectively.

The load characteristic obtainer 20 is constituted by a resistor R2, switch elements Q2 and Q3, and a microcomputer 31. The resistor R2 has a first end to which a DC voltage Vcc is applied, and a second end connected to a first end of the resistor R11 and a first end of the resistor R12. The switch element Q2 has a first end connected to a second end of the resistor R11, and a second end connected to the ground of circuit. Also, the switch element Q3 has a first end connected to a second end of the resistor R12, and a second end connected to the ground of circuit. FIG. 3 illustrates the switch elements Q2 and Q3 by schematic symbols, but the switch elements Q2 and Q3 are, for example, MOSFETs.

The output current detectors 40A and 40B are to detect output currents of the current outputters 10A and 10B, respectively.

The controller 30 includes the microcomputer 31 and drive signal generating circuits (DSGCs) 32A and 32B.

The microcomputer 31 has: an analog input port AD1 to which a voltage at a connecting point between the resistors R2, R11 and R12 is input; an analog input port AD2 to which a voltage is input, obtained by an input voltage V1A of the current outputter 10A being divided by resistors R3 and R4; and an analog input port AD3 to which a voltage is input, obtained by an input voltage V1B of the current outputter 10B being divided by resistors R5 and R6. Note that, in this embodiment, the input voltage V1A is equal to the input voltage V1B. The microcomputer 31 further has output ports PO1 and PO2 respectively connected to control terminals of the switch elements Q2 and Q3. The microcomputer 31 further has: an analog output port DA1 from which a target voltage is output to the drive signal generating circuit 32A; and an analog output port DA2 from which a target voltage is output to the drive signal generating circuit 32B.

The drive signal generating circuit 32A is configured to control the output of the current outputter 10A so that the output current matches a target current according to the luminous flux rank of the light source unit 100A, based on a detection voltage received from the output current detector 40A and the target voltage received from the microcomputer 31.

The drive signal generating circuit 32B is configured to control the output of the current outputter 10B so that the output current matches a target current according to the luminous flux rank of the light source unit 100B, based on a detection voltage received from the output current detector 40B and the target voltage received from the microcomputer 31.

Hereinafter, operation of the lighting device 1 according to the First Variation will be described.

In the case of the lighting device 1 according to the First Variation, when any one of switches SW1 and SW2 is turned on, a DC power supply E1 starts supply of electric power to the lighting device 1. Accordingly, the microcomputer 31 starts an initialization process. After the initialization process, the microcomputer 31 performs operation for reading the load information from the load information outputters 120A and 120B of the light source units 100A and 100B.

Until starting the operation for reading the load information, the microcomputer 31 keeps voltage levels of the output ports PO1 and PO2 at Low-levels, so that the switch elements Q2 and Q3 are in off states, respectively. In this state, no electric power is supplied into the load information outputters 120A and 120B.

Then upon the operation for reading the load information, first, the microcomputer 31 switches: the voltage level of the output port PO1 to a High-level to make the switch element Q2 in an on state; and the voltage level of the output port PO2 to the Low-level to make the switch element Q3 in the off state. At this time, the DC voltage Vcc is applied to a series circuit formed by the resistors R2 and R11, and thus the analog input port AD1 of the microcomputer 31 receives a divided voltage V11 obtained by the DC voltage Vcc being divided by the resistors R2 and R11.

In the on state of the switch element Q2 and the off state of the switch element Q3, the microcomputer 31 subjects the divided voltage V11, input to the analog input port AD1, to the A/D conversion to obtain the divided voltage V11. The microcomputer 31 compares a measured value of the divided voltage V11 with a determination range of a divided voltage in each luminous flux rank in order to determine load specification of the light source 110A, namely, a luminous flux rank of the light source 110A.

When succeeding in determination of the luminous flux rank of the light source 110A, the microcomputer 31 switches: the voltage level of the output port PO1 to the Low-level to make the switch element Q2 in the off state; and the voltage level of the output port PO2 to a High-level to make the switch element Q3 in an on state. At this time, the DC voltage Vcc is applied to a series circuit formed by the resistors R2 and R12, and thus the analog input port AD1 of the microcomputer 31 receives a divided voltage V12 obtained by the DC voltage Vcc being divided by the resistors R2 and R12.

In the off state of the switch element Q2 and the on state of the switch element Q3, the microcomputer 31 subjects the divided voltage V12, input to the analog input port AD1, to the A/D conversion to obtain the divided voltage V12. The microcomputer 31 compares a measured value of the divided voltage V12 with a determination range of a divided voltage in each luminous flux rank in order to determine load specification of the light source 110B, namely, a luminous flux rank of the light source 110B.

When succeeding in determination of the luminous flux ranks of the light sources 110A and 110B, the microcomputer 31 switches the voltage levels of the output ports PO1 and PO2 to the Low-levels to make the switch elements Q2 and Q3 in the off states. The microcomputer 31 performs the A/D conversion to voltages respectively input to the analog input ports AD2 and AD3, and calculates input voltages V1A and V1B of the current outputters 10A and 10B based on converted voltages.

While the switch SW1 is in an on state and further if the power supply voltage of the DC power supply E1 is within an operational range, the microcomputer 31 outputs the target voltage obtained based on the luminous flux rank of the light source 110A to the drive signal generating circuit 32A. The drive signal generating circuit 32A controls the output of the current outputter 10A so that the current according to the luminous flux rank is supplied to the light source 110A, based on the detection voltage received from the output current detector 40A and the target voltage received from the microcomputer 31.

While the switch SW1 is in an off state, or while the switch SW1 is in the on state but if the power supply voltage of the DC power supply E1 is out of the operational range, the microcomputer 31 does not output the target voltage to the drive signal generating circuit 32A, thereby causing the light source 110A to emit no light.

Similarly, while the switch SW2 is in an on state and further if the power supply voltage of the DC power supply E1 is within the operational range, the microcomputer 31 outputs the target voltage obtained based on the luminous flux rank of the light source 110B to the drive signal generating circuit 32B. The drive signal generating circuit 32B controls the output of the current outputter 10B so that the current according to the luminous flux rank is supplied to the light source 110B, based on the detection voltage received from the output current detector 40B and the target voltage received from the microcomputer 31.

While the switch SW2 is in an off state, or while the switch SW2 is in the on state but if the power supply voltage of the DC power supply E1 is out of the operational range, the microcomputer 31 does not output the target voltage to the drive signal generating circuit 32B, thereby causing the light source 110B to emit no light.

As described above, in this First Variation, the one lighting device 1 causes the two light source units 100A and 100B to emit light, and the load characteristic obtainer 20 of the lighting device 1 obtains the load information of the light source units 100A and 100B, before causing them to emit light. The load characteristic obtainer 20 supplies the electric power to the load information outputter 120A of the light source unit 100A only during a time period of obtaining the load information from the load information outputter 120A, but stops supply of the electric power to the load information outputter 120A during a time period other than the time period of obtaining the load information. Also, the load characteristic obtainer 20 supplies the electric power to the load information outputter 120B of the light source unit 100B only during a time period of obtaining the load information from the load information outputter 120B, but stops supply of the electric power to the load information outputter 120B during a time period other than the time period of obtaining the load information. It is therefore possible to suppress the power consumption of the load characteristic obtainer 20, compared with a case of continuously supplying the electric power to the load information outputters 120A and 120B even during the time period other than the time period of obtaining the load information.

Furthermore, the load characteristic obtainer 20 supplies the electric power to the load information outputters 120A and 120B at timings different from each other, respectively. It is therefore possible to reduce the power consumption, compared with a case of supplying the electric power to the load information outputters 120A and 120B at the same timing.

In this First Variation, the resistor R2, the switch element Q2 and the microcomputer 31 constitute a circuit obtaining the load information from the load information outputter 120A, and the resistor R2, the switch element Q3 and the microcomputer 31 constitute a circuit obtaining the load information from the load information outputter 120B. That is, in the load characteristic obtainer 20, the circuits obtaining the load information from the load information outputters 120A and 120B include a common circuit element(s) (resistor R2) so as to share the common circuit element. Thus, it is possible to reduce the number of circuit components, and downsize the whole circuit of the lighting device 1.

In the load characteristic obtainer 20 of this First Variation, the switch element Q2 is connected between the resistor R11 of the load information outputter 120A and the ground of circuit, but it may be connected between the resistors R2 and R11. In this case, the resistor R11 has a first end connected to the switch element Q2 and a second end connected to the ground of circuit.

Also in the load characteristic obtainer 20 of this First Variation, the switch element Q3 is connected between the resistor R12 of the load information outputter 120B and the ground of circuit, but it may be connected between the resistors R2 and R12. In this case, the resistor R12 has a first end connected to the switch element Q3 and a second end connected to the ground of circuit.

In this way, since the switch elements Q2 and Q3 are connected between the resistors R2 and R11 and between the resistors R2 and R12, respectively, it is possible to prevent currents from continuously flowing through the resistors R2, R11 and R12, even when a failure occurs, such that the electric wires connecting the lighting device 1 and the light source units 100A and 100B are in a ground fault.

The load characteristic obtainer 20 obtains the load information from the light source unit 100A and then from the light source unit 100B, but the order obtaining the load information is not limited to this. The load characteristic obtainer 20 may supply the electric power to the load information outputter 120B to obtain the load information from the light source unit 100B, and then supply the electric power to the load information outputter 120A to obtain the load information from the light source unit 100A. That is, the load characteristic obtainer 20 may supply the electric power to the corresponding load information outputters 120 of the plurality of light source units 100 in sequence so as to obtain the load information from the load information outputters 120 in sequence.

In this First Variation, the one lighting device 1 causes the two light source units 100A and 100B to emit light, but it may cause three or more light source units 100 to emit light. Also in this case, the load characteristic obtainer 20 may supply electric power to a load information outputter 120 of each light source unit 100 individually, only during a time period of obtaining the load information from the load information outputter 120.

(1. 3. 2) Second Variation

Figure 4:
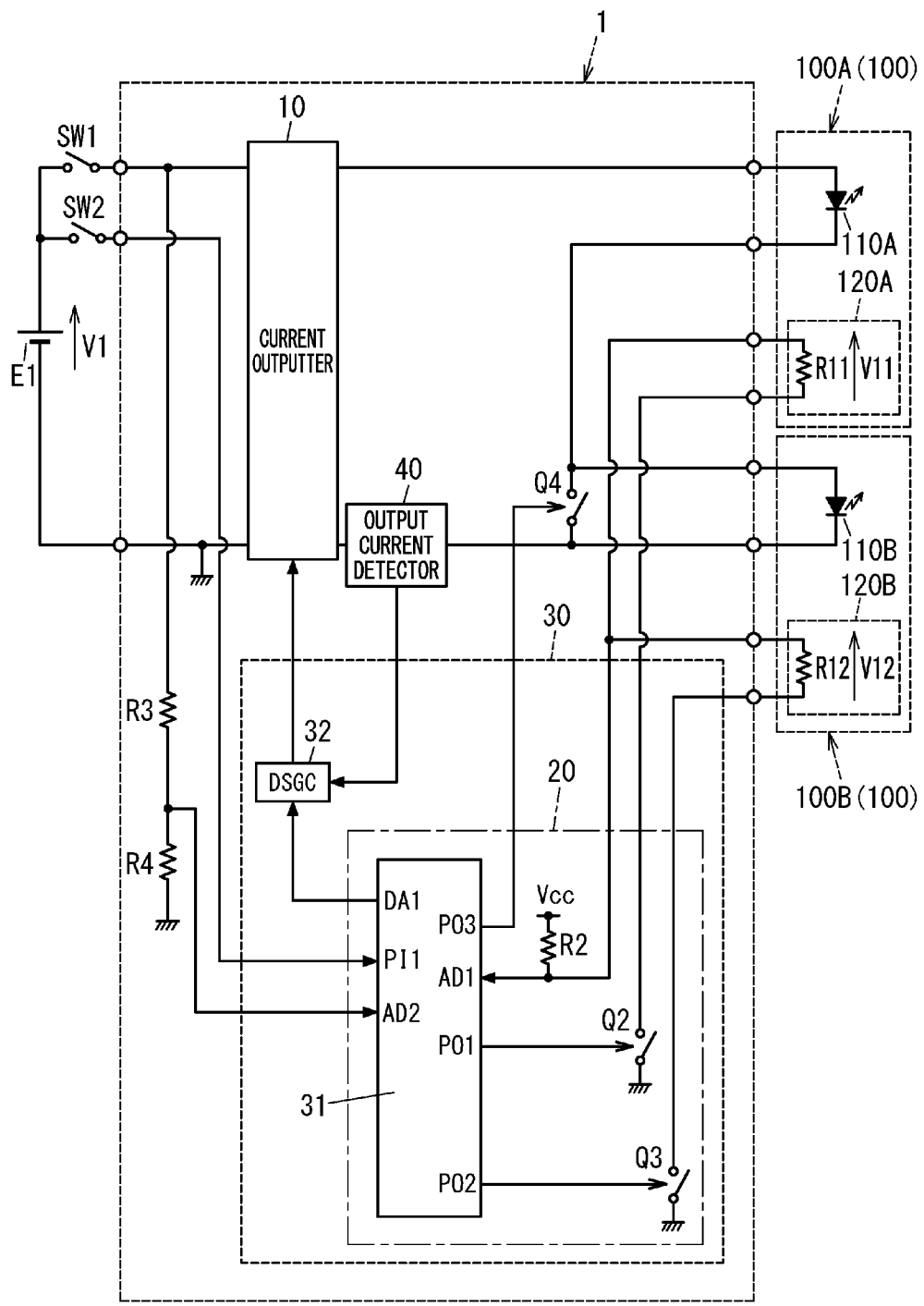
FIG. 4 is a circuit diagram of a Second Variation of the lighting device according to the First Embodiment.

FIG. 4 is a circuit diagram of a lighting device 1 according to a Second Variation.

In the First Variation the lighting device 1 includes the two current outputters 10A and 10B configured to respectively supply currents to the two light source units 100A and 100B, but in this Second Variation the lighting device 1 includes a single current outputter 10 configured to supply a current to two light source units 100A and 100B.

Hereinafter, components similar to those of the First Embodiment (including the First Variation) are denoted by same reference signs and explanations thereof are omitted. In particular, since a current outputter 10, a drive signal generating circuit (DSGC) 32 and an output current detector 40 of this Second Variation are similar to those of the First Embodiment, explanations thereof are omitted. Also since a load characteristic obtainer 20 of this Second Variation is similar to that of the First Variation, an explanation thereof is omitted.

Light sources 110A and 110B of the light source units 100A and 100B are connected in series to each other between output terminals of the current outputter 10. A switch element Q4 is connected in parallel to the light source 110B, which is one of the light sources 110A and 110B. As a result, a current output from the current outputter 10 continuously flows through the light source 110A, regardless of on/off of the switch element Q4. On the other hand, regarding the light source 110B the current output from the current outputter 10 flows through it only while the switch element Q4 is in an off state. It is herein assumed that the light source units 100A and 100B are used for headlights, and in particular, for example, the light source 110A of the light source unit 100A is a headlight for passing beam (so-called low-beam) and the light source 110B of the light source unit 100B is a headlight for travelling beam (so-called high-beam). The light source 110B is accordingly configured to emit light only while the switch element Q4 is in the off state.

A microcomputer 31 of this Second Variation has: an input port PI1 connected to a positive electrode of a DC power supply E1 so that a switch SW2 is interposed between the input port PI1 and the positive electrode; and an output port PO3 connected to a control terminal of the switch element Q4.

Hereinafter, operation of the lighting device 1 according to the Second Variation will be described.

When a switch SW1 is turned on, the DC power supply E1 starts supply of the electric power to the lighting device 1. Accordingly, the microcomputer 31 starts an initialization process. After the initialization process, the microcomputer 31 performs operation for reading the load information from load information outputters 120A and 120B of the light source units 100A and 100B. After reading the load information from the load information outputters 120A and 120B, the microcomputer 31 determines luminous flux ranks of the light sources 110A and 110B, and sets respective target values of the output currents according to the luminous flux ranks. Since in the Second variation, a series of processes from a step of the load characteristic obtainer 20 obtaining the load information to a step of setting the target values of the output currents are similar to those in the First Variation, explanations thereof are omitted.

The microcomputer 31 monitors a voltage level at the input port PI1 to determine, based on the voltage level, whether both of the light source units 100A and 100B or only the light source unit 100A should be turned on.

For example, when the switch SW2 is in an off state and the voltage level at the input port PI1 is accordingly made to a Low-level, the microcomputer 31 outputs a High-level signal via the output port PO3 to make the switch element Q4 in an on state, thereby causing only the light source unit 100A to emit light. The microcomputer 31 further sets a value in a case of causing only the light source unit 100A to emit light, as a setting value of an output current of the current outputter 10. The microcomputer 31 determines whether or not an input voltage of the current outputter 10 is within an operational range, and outputs a target voltage according to the setting value of the output current to the drive signal generating circuit 32 if the input voltage is determined to be within the operational range. The drive signal generating circuit 32 controls an output of the current outputter 10, based on a detection voltage received from the output current detector 40 and the target voltage received from the microcomputer 31. Thus, the current outputter 10 can supply, to the light source unit 100A, a current required to cause only the light source unit 100A to emit light.

On the other hand, when the switch SW2 is in an on state and the voltage level at the input port PI1 is accordingly made to a High-level, the microcomputer 31 outputs a Low-level signal via the output port PO3 to make the switch element Q4 in an off state, thereby causing both of the light source units 100A and 100B to emit light. The microcomputer 31 sets a smaller value of values in cases of causing the light source units 100A and 100B to emit light, as the setting value of the output current of the current outputter 10. The microcomputer 31 determines whether or not the input voltage of the current outputter 10 is within the operational range, and outputs the target voltage according to the setting value of the output current to the drive signal generating circuit 32 if the input voltage is determined to be within the operational range. The drive signal generating circuit 32 controls the output of the current outputter 10, based on the detection voltage received from the output current detector 40 and the target voltage received from the microcomputer 31. Thus, the current outputter 10 can supply, to both of the light source units 100A and 100B, a current required to cause them to emit light.

Note that, in a case of causing a plurality of light source units 100 connected in parallel to each other to emit light, using a single current outputter 10, a controller 30 may control the output current of the single current outputter 10 so as to match a total value of rated currents of the plurality of light source units 100, based on the load information received from the plurality of light source units 100.

(1. 3. 3) Other Variations

In the First Embodiment, the number of ranks in luminous characteristics of light sources 110 is five, but may be two or more.

The light source 110 is not limited to an LED(s), but may be, for example, an organic light-emitting diode(s), as long as the light source 110 is a semiconductor light source.

The load information outputter 120 includes a resistor, and outputs a voltage value previously determined for a luminous characteristic of the lights source 110 when electric power is supplied thereto. However, instead of the voltage value, the load information outputter 120 may output a current value previously determined for the luminous characteristic.

Instead of the resistor, the load information outputter 120 may include a memory storing the load information, or the like. In this case, the load characteristic obtainer 20 may have an interface for obtaining the load information from the memory of the load information outputter 120, and supply electric power to the memory (load information outputter 120) only during a time period of reading the load information.

Second Embodiment

Figure 5:
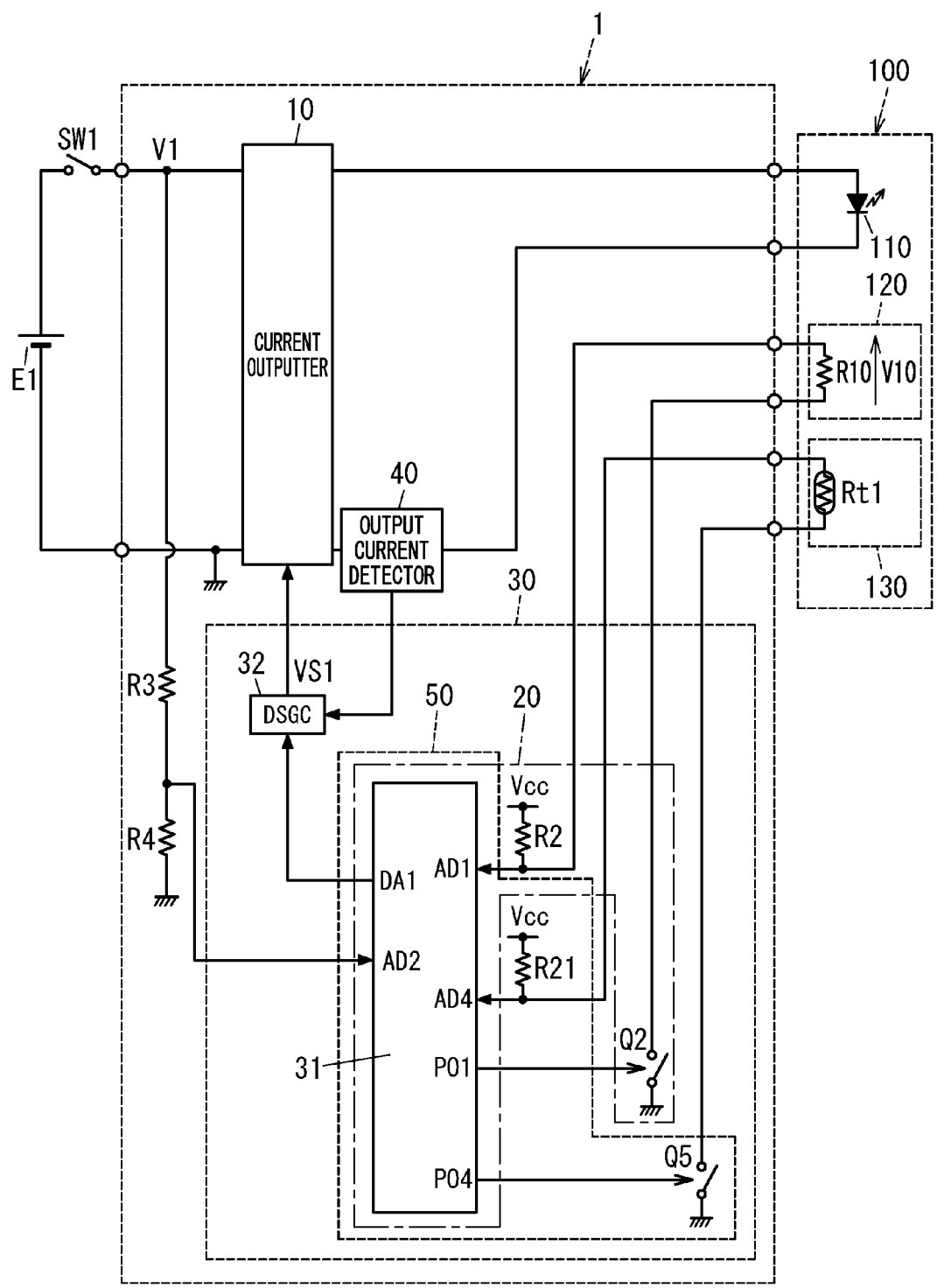
FIG. 5 is a circuit diagram of a lighting device according to a Second Embodiment of the present disclosure.

A lighting device 1 according to a Second Embodiment will be described with reference to FIG. 5. A configuration in the Second Embodiment (including variations) described below can be applied in appropriately combination with configurations in the other embodiments (including variations).

(2. 1) Configuration

The lighting device 1 of this embodiment includes a current outputter 10, a load characteristic obtainer 20, a temperature obtainer 50 and a controller 30. The lighting device 1 of this embodiment further includes an output current detector 40. Since the current outputter 10, the load characteristic obtainer 20 and the output current detector 40 are similar to those in the First Embodiment, explanations thereof are omitted.

The lighting device 1 of this embodiment is used for causing a light source unit 100, installed to a vehicle such as an automobile, to emit light. The light source unit 100 includes a light source 110, a load information outputter 120 and a temperature probe 130 for measuring a temperature of the light source unit 100. Note that since the light source 110 and the load information outputter 120 are similar to those in the First Embodiment, explanations thereof are omitted.

The temperature probe 130 is used for measuring a temperature around the light source 110. The temperature probe 130 includes, for example, a thermistor Rt1 disposed inside a casing of the light source unit 100. A resistance value of the thermistor Rt1 is changed, depending on the temperature around the light source 110. The temperature probe 130 may be disposed so as to measure directly a temperature of the light source 110.

The temperature obtainer 50 of the lighting device 1 is constituted by a resistor R21, a switch element Q5 and a microcomputer 31. The resistor R21 has a first end to which a DC voltage Vcc is applied, and a second end connected to a first end of the thermistor Rt1. The switch element Q5 is connected between a second end of the thermistor Rt1 and the ground of circuit.

The controller 30 includes the microcomputer 31 and a drive signal generating circuit 32. Since the drive signal generating circuit 32 in this embodiment has a configuration similar to that in the First Embodiment, an explanation thereof is omitted.

The microcomputer 31 includes a CPU and a memory. The CPU executes a program(s) stored in the memory, thereby the following functions and the like being realized: a function of obtaining the load information from the load information outputter 120; a function of determining the luminous characteristic, using the load information; a function of obtaining a measuring value of the temperature from the temperature probe 130; and a function of controlling an output of the current outputter 10 in accordance with the luminous characteristic and the measuring value of the temperature. The microcomputer 31 has output ports PO1 and PO4 connected to control electrodes of the switch elements Q2 and Q5, respectively. The microcomputer 31 further has: an analog input port AD1 to which a voltage at a connecting point between resistors R2 and R10 is input; an analog input port AD4 to which a voltage at a connecting point between the resistor R21 and the thermistor Rt1 is input; and an analog output port DA1 connected to the drive signal generating circuit 32. The program(s) to be executed by the CPU of the microcomputer 31 may be previously stored in the memory in time of factory shipment of the lighting device 1, or may be recorded and provided in a storage medium such as a memory card. Alternatively, the program(s) may be provided through an electric telecommunication line.

(2. 2) Explanation of Operation

Operation of the lighting device 1 of this embodiment will be explained below.

When a power supply switch SW1 is turned on in response to an operation of a driver who drives a vehicle or an on-command from an ECU of the vehicle, electric power is supplied from a DC power supply E1 to the lighting device 1. Accordingly, the microcomputer 31 starts an initialization process. After the initialization process, the microcomputer 31 performs operation for reading the load information from the load information outputter 120 of the light source unit 100. After the operation for reading the load information, the microcomputer 31 performs operation for determining the luminous flux rank based on the load information. Note that since this operation for determining the luminous flux rank is similar to that in the First Embodiment, an explanation thereof is omitted.

Next, the microcomputer 31 performs operation for reading the measuring value of the temperature from the temperature probe 130 of the light source unit 100. Until starting the operation for reading the measuring value of the temperature, the microcomputer 31 keeps a voltage level of the output port PO4 at a Low-level, so that the switch element Q5 is in an off state. In this state, no electric power is supplied into the temperature probe 130. Then upon the operation for reading the measuring value of the temperature, the microcomputer 31 switches the voltage level of the output port PO4 to a High-level to make the switch element Q5 in an on state. At this time, the DC voltage Vcc is applied to a series circuit formed by the resistor R21 and the thermistor Rt1, and thus the analog input port AD4 of the microcomputer 31 receives a divided voltage obtained by the DC voltage Vcc being divided by the resistor R21 and the thermistor Rt1.

In the on state of the switch element Q5, the microcomputer 31 subjects the divided voltage, input to the analog input port AD4, to the A/D conversion to obtain the divided voltage. The microcomputer 31 calculates a resistance value of the thermistor Rt1, using the divided voltage, input to the analog input port AD4, and then obtains the temperature around the light source 110 from the resistance value of the thermistor Rt1. After obtaining a measured value of the divided voltage, the microcomputer 31 switches the voltage level of the output port PO4 to the Low-level to make the switch element Q5 in the off state. Supplying of the electric power to the thermistor Rt1 is accordingly cut off. In this way, the microcomputer 31 supplies the electric power to the temperature probe 130 only during a time period of obtaining the measuring value of the temperature, but stops supply of the electric power to the temperature probe 130 during a time period other than the time period of obtaining the measuring value of the temperature.

When succeeding in determination of the luminous flux rank of the light source 110, the microcomputer 31 obtains a setting value of an output current corresponding to the luminous flux rank from the memory. Furthermore, the microcomputer 31 corrects the setting value of the output current determined based on the luminous flux rank, using the measuring value of the temperature obtained from the temperature probe 130. The memory of the microcomputer 31 previously stores, for example, a temperature threshold and a correction amount to be used when the measuring value of the temperature exceeds the temperature threshold.

If the measuring value of the temperature obtained from the temperature probe 130 is less than the temperature threshold, the microcomputer 31 determines a target voltage, using the setting value of the output current determined based on the luminous flux rank, and then outputs the target voltage to the drive signal generating circuit 32 through the analog output port DA1. On the other hand, if the measuring value of the temperature obtained from the temperature probe 130 is equal to or more than the temperature threshold, the microcomputer 31 subtracts the correction amount from the setting value of the output current determined based on the luminous flux rank, in order to obtain a corrected setting value of the output current. The microcomputer 31 then determines the target voltage based on the corrected setting value of the output current, and outputs the target voltage to the drive signal generating circuit 32 through the analog output port DA1.

The drive signal generating circuit 32 adjusts a duty ratio (an on-duty) of a drive signal VS1 so that a detection voltage obtained from the output current detector 40 matches the target voltage received from the microcomputer 31, and the output current of the current outputter 10 is accordingly controlled so as to have a desired current value.

In this embodiment, the microcomputer 31 periodically obtains the measuring value of the temperature from the temperature probe 130 while the light source unit 100 is in lighting, and further periodically performs a processing for correcting the setting value of the output current, using the measuring value of the temperature. In this embodiment, the microcomputer 31 performs operation for reducing the output current when the temperature is relatively high, using the measuring value of the temperature.

Incidentally, in the light source unit 100, the LED of the light source 110 is attached to a heat radiation board, a heat sink or the like. For this reason, it is expected that a change in the temperature of the light source 110 is slower than a control period for the feedback control of the drive signal generating circuit 32. Therefore, the microcomputer 31 obtains the measuring value of the temperature from the temperature probe 130, at a period longer than the control period for the feedback control of the drive signal generating circuit 32. For example, when the control period is set to almost 100 μsec, the microcomputer 31 may obtain the measuring value of the temperature from the temperature probe 130, at a period from almost 10 msec to almost 1 sec.

It is herein assumed that, in the temperature obtainer 50 of the lighting device 1, the DC voltage Vcc and the resistance value of the resistor R21 are 5V and 1 kΩ, respectively. It is also assumed that the thermistor Rt1 has specification where a resistance value at 25° C. agrees with 10 kΩ, and a B constant between 25° C. and 50° C. is 3380K.

The resistance value of the thermistor Rt1 is changed into 10 kΩ at 25° C., 0.9760 kΩ at 100° C., and 0.5324 kΩ at 125° C., that is, it is reduced depending on an increase in the temperature. Accordingly, the divided voltage, input to the analog input port AD4 of the microcomputer 31, is reduced, as the temperature is increased. Specifically, the divided voltage becomes, for example, 4.545V at 25° C., 2.470V at 100° C., and 1.737V at 125° C. The microcomputer 31 can therefore obtain the temperature around the light source 110, using the divided voltage, input to the analog input port AD4.

While the temperature obtainer 50 obtains the measuring value of the temperature from the temperature probe 130, the current flowing through the thermistor Rt1 becomes, for example, 0.455 mA at 25° C., 2.530 mA at 100° C., and 3.263 mA at 125° C. Since the resistance value of the thermistor Rt1 is reduced depending on the increase in the temperature as described above, the current flowing through the thermistor Rt1 is increased as the temperature is increased, while the temperature obtainer 50 obtains the measuring value of the temperature from the temperature probe 130. In this embodiment, even when the temperature is relatively high, the temperature obtainer 50 supplies the power to the temperature probe 130 only during a time period of obtaining the temperature. It is therefore possible to suppress power consumption of the temperature probe 130, compared with a case where the power is continuously supplied to the temperature probe 130.

(2. 3) Variations

Hereinafter, variations of the above embodiment will be listed. Note that the variations explained below can be applied in appropriately combination with the First and Second Embodiments.

(2. 3. 1) First Variation

Figure 6:
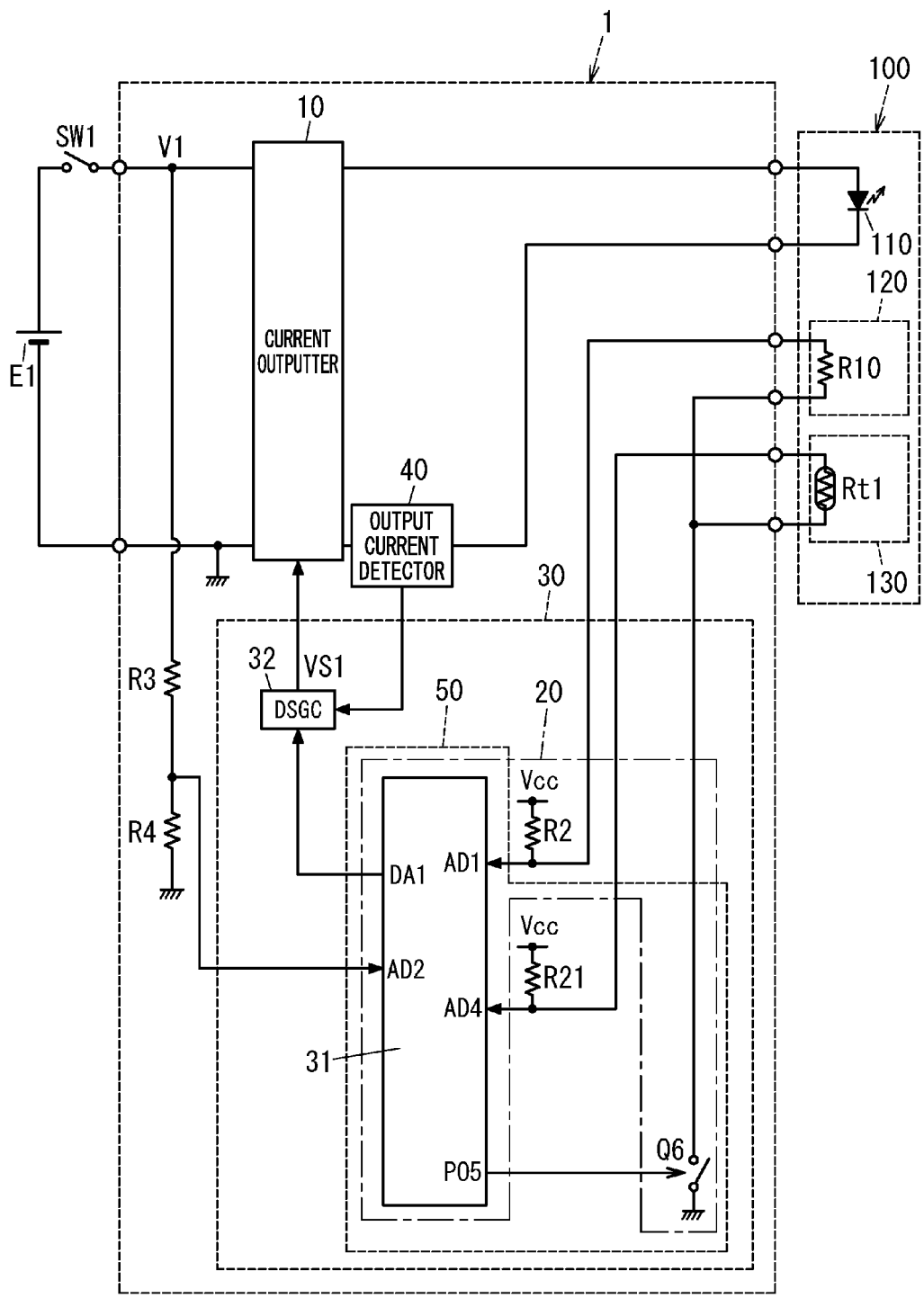
FIG. 6 is a circuit diagram of a First Variation of the lighting device according to the Second Embodiment.

FIG. 6 is a circuit diagram of a lighting device 1 according to a First Variation. Hereinafter, components similar to those of the Second Embodiment are denoted by same reference signs and explanations thereof are omitted.

In the above Second Embodiment, the switch element Q2 is connected between the resistor R10 and the ground of circuit, and the switch element Q5 is connected between the thermistor Rt1 and the ground of circuit, so that the switch elements Q2 and Q5 are individually turned on/off by the microcomputer 31. On the other hand, in this First Variation, a switch element Q6 is connected between a resistor R10 and the ground of circuit and further between a thermistor Rt1 and the ground of circuit. The switch element Q6 has a control terminal connected to an output port PO5 of a microcomputer 31.

The microcomputer 31 keeps a voltage level of the output port PO5 at a Low-level, so that the switch element Q6 is in an off state, during a time period other than a time period of obtaining the load information and the measuring value of the temperature. Accordingly, no electric power is supplied to a load information outputter 120 and a temperature probe 130.

On the other hand, the microcomputer 31 switches the voltage level at the output port PO5 to a High-level, so that the switch element Q6 is in an on state, only during the time period of obtaining the load information and the measuring value of the temperature. In the on state of the switch element Q6, the electric power is supplied to the load information outputter 120 and the temperature probe 130. While keeping the voltage level of the output port PO5 at the High-level, the microcomputer 31 subjects input voltages of the analog input ports AD1 and AD4 to an A/D conversion to obtain the load information of a light source 110 and the measuring value of the temperature.

The microcomputer 31 determines a luminous flux rank based on the load information of the light source 110, and controls an output current of a current outputter 10 based on the luminous flux rank and the measuring value of the temperature. In the microcomputer 31, since the process controlling the output current of the current outputter 10 based on the luminous flux rank of the light source 110 and the measuring value of the temperature is similar to that in the Second Embodiment, an explanation thereof is omitted.

In this First Variation, a load characteristic obtainer 20 is constituted by a resistor R2, the switch element Q6 and the microcomputer 31, and a temperature obtainer 50 is constituted by a resistor R21, the switch element Q6 and the microcomputer 31. In other words, circuits of the load characteristic obtainer 20 and the temperature obtainer 50 include a common circuit element (switch element Q6) so as to share the common circuit element. It is therefore possible to downsize the whole circuit of the lighting device 1, compared with a case where the load characteristic obtainer 20 and the temperature obtainer 50 respectively include switch elements different from each other.

(2. 3. 2) Second Variation

Figure 7:
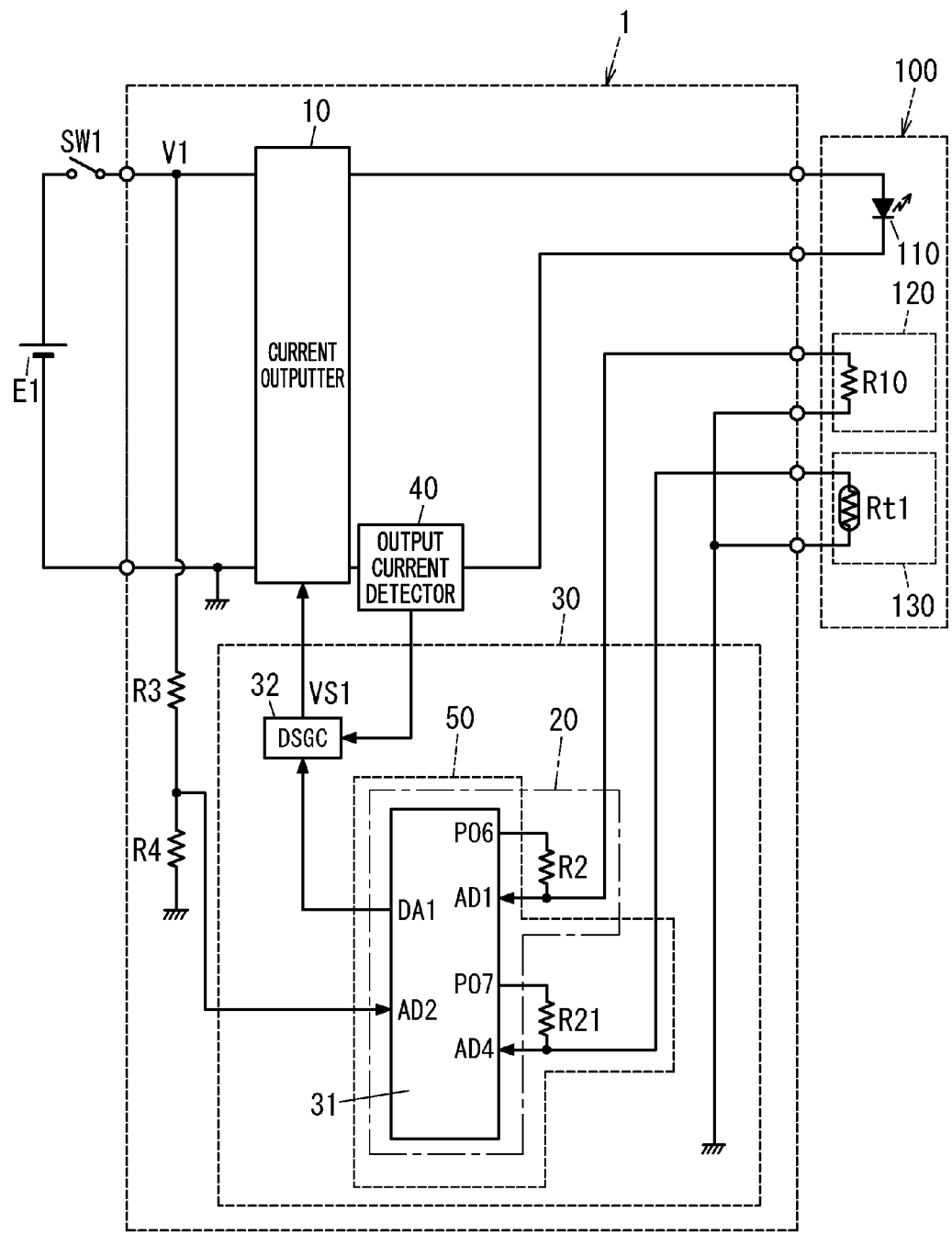
FIG. 7 is a circuit diagram of a Second Variation of the lighting device according to the Second Embodiment.

FIG. 7 is a circuit diagram of a lighting device 1 according to a Second Variation. Hereinafter, components similar to those of the Second Embodiment are denoted by same reference signs and explanations thereof are omitted.

In the Second Embodiment, the power supply circuit generating the DC voltage Vcc applies voltages to the load information outputter 120 and the temperature probe 130. In contrast, in this Second Variation, a microcomputer 31 applies, through output ports PO6 and PO7 thereof, voltages to a load information outputter 120 and a temperature probe 130, respectively.

In other words, resistors R2 and R10 are connected in series to each other between the output port PO6 of the microcomputer 31 and the ground of circuit, so that a voltage at a connecting point between the resistors R2 and R10 is input to an analog input port AD1 of the microcomputer 31.

Furthermore, a resistor R21 and a thermistor Rt1 are connected in series to each other between the output port PO7 of the microcomputer 31 and the ground of circuit, so that a voltage at a connecting point between the resistor R21 and the thermistor Rt1 is input to an analog input port AD4 of the microcomputer 31.

In this Second Variation, the microcomputer 31 keeps a voltage level of the output port PO6 at a Low-level, so that no electric power is supplied to the load information outputter 120, during a time period other than a time period of obtaining the load information. The microcomputer 31 switches the voltage level of the output port PO6 to a High-level, so that a constant voltage is applied through the output port PO6 to the series circuit formed by the resistors R2 and R10, during the time period of obtaining the load information. At this time, the microcomputer 31 subjects a divided voltage, input to the analog input port AD1, to an A/D conversion to obtain a voltage across the resistor R10, and then determines a luminous flux rank of a light source 110, using the voltage across the resistor R10.

Also the microcomputer 31 keeps a voltage level of the output port PO7 at a Low-level, so that no electric power is supplied to the temperature probe 130, during a time period other than a time period of obtaining the measuring value of the temperature. The microcomputer 31 switches the voltage level of the output port PO7 to a High-level, so that a constant voltage is applied through the output port PO7 to the series circuit formed by the resistor R21 and the thermistor Rt1, during the time period of obtaining the measuring value of the temperature from the temperature probe 130. At this time, the microcomputer 31 subjects a divided voltage, input to the analog input port AD4, to an A/D conversion to obtain a voltage across the thermistor Rt1, and then obtains the measuring value of the temperature from the voltage across the thermistor Rt1.

In this Second Variation, since the microcomputer 31 applies, through the output ports PO6 and PO7, the voltages to the load information outputter 120 and the temperature probe 130, respectively, the switch elements Q2 and Q5 in the Second Embodiment are not required. It is therefore possible to downsize the whole circuit of the lighting device 1, compared with the Second Embodiment.

(2. 3. 3) Third Variation

Figure 8:
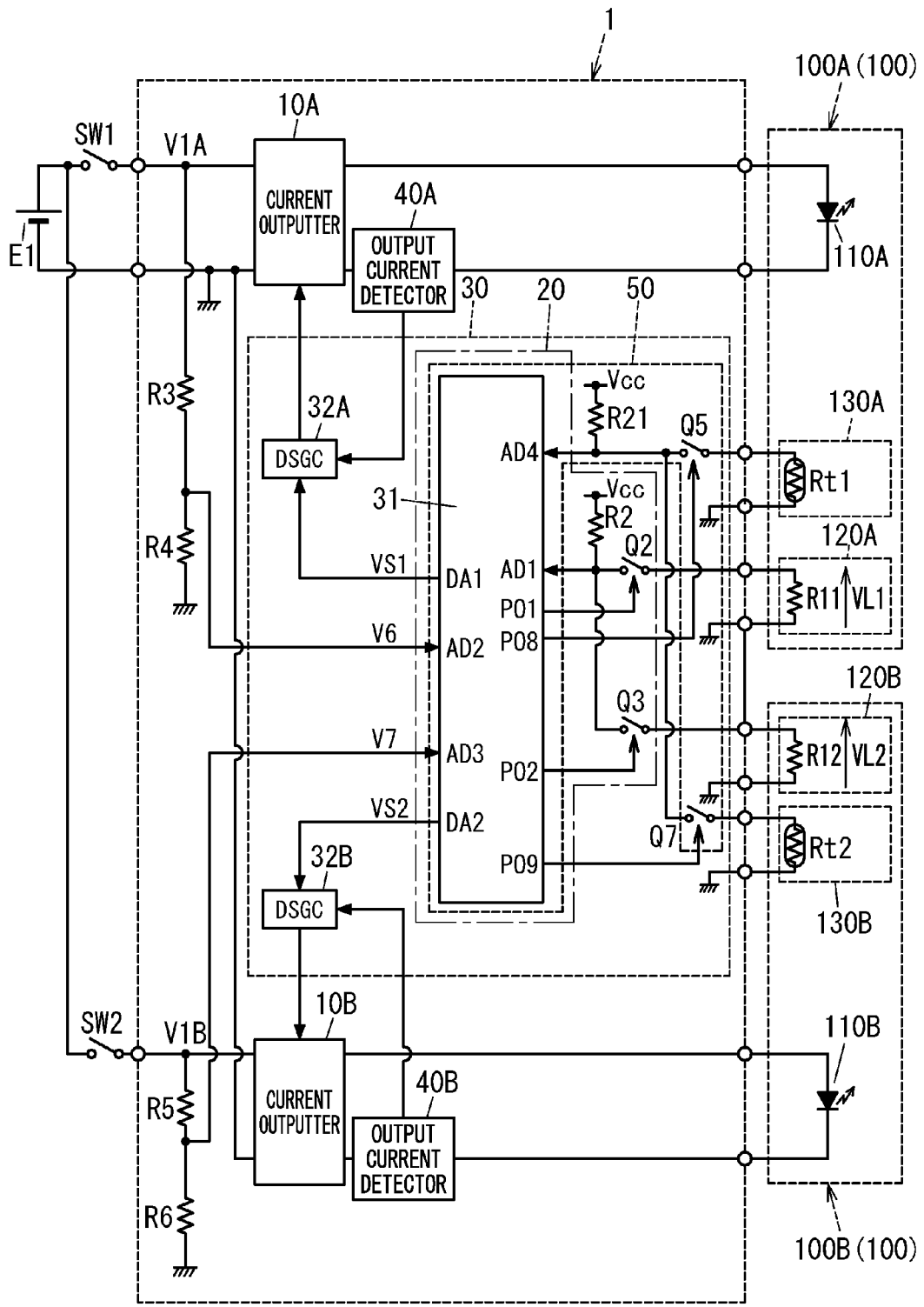
FIG. 8 is a circuit diagram of a Third Variation of the lighting device according to the Second Embodiment.

FIG. 8 is a circuit diagram of a lighting device 1 according to a Third Variation. Hereinafter, components similar to those of the Second Embodiment are denoted by same reference signs and explanations thereof are omitted.

In the Second Embodiment one lighting device 1 causes one light source unit 100 to emit light, but in this Third Variation one lighting device 1 causes two light source units 100A and 100B to emit light. Note that components similar to those of the Second Embodiment or the First Variation of the First Embodiment are denoted by same reference signs and explanations thereof are omitted.

The light source units 100A and 100B respectively include light sources 110A and 110B, each of which includes a semiconductor light-emitting element(s) such as an LED(s). The light source units 100A and 100B further include load information outputters 120A and 120B which are to output load information representing luminous characteristics of the light sources 110A and 110B, when electric power is supplied to the load information outputters 120A and 120B, respectively. The light source units 100A and 100B further include temperature probes 130A and 130B which are used for measuring temperatures of the light sources 110A and 110B, respectively.

The lighting device 1 includes current outputters 10A and 10B, a load characteristic obtainer 20, a temperature obtainer 50, a controller 30, and output current detectors 40A and 40B. Since configurations of the current outputters 10A and 10B and the output current detectors 40A and 40B are similar to those in the First Variation of the First Embodiment, explanations thereof are omitted.

The load characteristic obtainer 20 is constituted by a resistor R2, switch elements Q2 and Q3, and a microcomputer 31. The resistor R2 has a first end to which a DC voltage Vcc is applied, and a second end connected to first ends of the switch elements Q2 and Q3. A first end and a second end of a resistor R11 are connected to a second end of the switch element Q2 and the ground of circuit, respectively. A first end and a second end of a resistor R12 are connected to a second end of the switch element Q3 and the ground of circuit, respectively.

The temperature obtainer 50 is constituted by a resistor R21, switch elements Q5 and Q7, and the microcomputer 31. The resistor R21 has a first end to which the DC voltage Vcc is applied, and a second end connected to first ends of the switch elements Q5 and Q7. A first end and a second end of a thermistor Rt1 are connected to a second end of the switch element Q5 and the ground of circuit, respectively. A first end and a second end of a thermistor Rt2 are connected to a second end of the switch element Q7 and the ground of circuit, respectively.

The controller 30 includes the microcomputer 31 and drive signal generating circuits 32A and 32B. Since configurations of the drive signal generating circuits 32A and 32B are similar to those in the First Variation of the First Embodiment, explanations thereof are omitted.

The microcomputer 31 has: an analog input port AD1 to which a voltage at a connecting point between the resistor R2 and the switch elements Q2 and Q3 is input; an analog input port AD2 to which a voltage is input, obtained by an input voltage V1A of the current outputter 10A being divided by resistors R3 and R4; an analog input port AD3 to which a voltage is input, obtained by an input voltage V1B of the current outputter 10B being divided by resistors R5 and R6; and an analog input port AD4 to which a voltage at a connecting point between the resistor R21 and the switch elements Q5 and Q7 is input. The microcomputer 31 further has output ports PO1, PO2, PO8 and PO9 connected to control terminals of the switch elements Q2, Q3, Q5 and Q7, respectively. The microcomputer 31 further has: an analog output port DA1 from which a target voltage is output to the drive signal generating circuit 32A; and an analog output port DA2 from which a target voltage is output to the drive signal generating circuit 32B.

Figure 9:
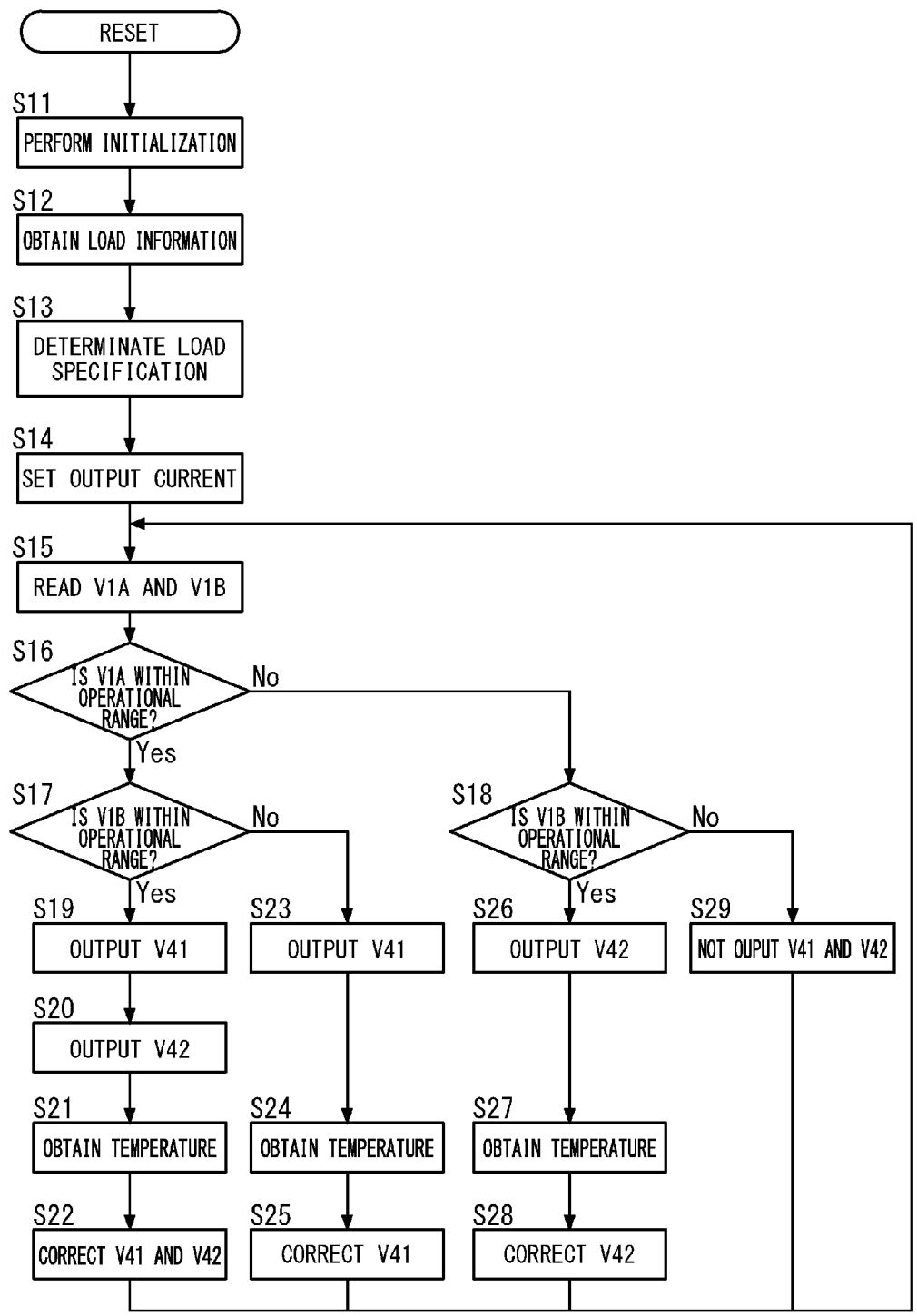
FIG. 9 is a flowchart for explaining operation of the lighting device according to the Second Embodiment.

Hereinafter, operation of the lighting device 1 according to the Third Variation will be described with reference to a flowchart of FIG. 9.

In the case of the lighting device 1 according to the Third Variation, when any one of switches SW1 and SW2 is turned on, electric power is supplied from a DC power supply E1 to the lighting device 1. Accordingly, the microcomputer 31 starts an initialization process (refer to a Step S11). After the initialization process, the microcomputer 31 performs operation for reading the load information from the load information outputters 120A and 120B of the light source units 100A and 100B (refer to a Step S12).

Until starting the operation for reading the load information, the microcomputer 31 keeps voltage levels of the output ports PO1 and PO2 at Low-levels, so that the switch elements Q2 and Q3 are in off states, respectively. In this state, no electric power is supplied into the load information outputters 120A and 120B. Then upon the operation for reading the load information, first, the microcomputer 31 switches the voltage level of the output port PO1 to a High-level to make the switch element Q2 in an on state. At this time, the DC voltage Vcc is applied to a series circuit formed by the resistors R2 and R11, and thus the analog input port AD1 of the microcomputer 31 receives a divided voltage VL1 obtained by the DC voltage Vcc being divided by the resistors R2 and R11. In the on state of the switch element Q2, the microcomputer 31 subjects the divided voltage VL1, input to the analog input port AD1, to an A/D conversion to obtain a value of the divided voltage VL1. After obtaining the divided voltage VL1, the microcomputer 31 switches the voltage level of the output port PO1 to the Low-level to make the switch element Q2 in the off state. Supplying of the electric power to the resistor R11 is accordingly cut off.

Next, the microcomputer 31 switches the voltage level of the output port PO2 to a High-level to make the switch element Q3 in an on state. At this time, the DC voltage Vcc is applied to a series circuit formed by the resistors R2 and R12, and thus the analog input port AD1 of the microcomputer 31 receives a divided voltage VL2 obtained by the DC voltage Vcc being divided by the resistors R2 and R12. In the on state of the switch element Q3, the microcomputer 31 subjects the divided voltage VL2, input to the analog input port AD1, to an A/D conversion to obtain a value of the divided voltage VL2. After obtaining a measured value of the divided voltage VL2, the microcomputer 31 switches the voltage level of the output port PO2 to the Low-level to make the switch element Q3 in the off state. Supplying of the electric power to the resistor R12 is accordingly cut off.

After obtaining the divided voltages VL1 and VL2, the microcomputer 31 compares a measured value of each of the divided voltages VL1 and VL2 with a determination range of a divided voltage in each luminous flux rank in order to determine luminous flux ranks (load specification) of the light sources 110A and 110B (refer to a Step S13). When succeeding in determination of the luminous flux ranks of the light sources 110A and 110B, the microcomputer 31 obtains setting values of output currents corresponding to the determined luminous flux ranks from the memory (refer to a Step S14). If at least any one of the measured values of the divided voltages VL1 and VL2 fails to meet any of the determination ranges corresponding to the luminous flux ranks 1 to 5, the microcomputer 31 determines that abnormality occurs in a circuit obtaining the load information from the load information outputter 120, or the like, and cancels a process for setting the target values of the output currents.

When succeeding in determination of the luminous flux ranks of the light sources 110A and 110B, the microcomputer 31 subjects a voltage V6, input to the analog input port AD2, to an A/D conversion, and then obtains an input voltage V1A input to the current outputter 10A from a measured value of the voltage V6. Also the microcomputer 31 subjects a voltage V7, input to the analog input port AD3, to an A/D conversion, and then obtains an input voltage V1B input to the current outputter 10B from a measured value of the voltage V7 (refer to a Step S15).

After obtaining measured values of the input voltages V1A and V1B, the microcomputer 31 determines whether or not each of the measured values of the input voltages V1A and V1B is within an operational range (refer to Steps S16, S17 and S18). Since the DC power supply E1 uses a battery of a vehicle as a power source, a power supply voltage of the DC power supply E1 may be changed. If the measured values of the input voltages V1A and V1B each are within the operational range, the microcomputer 31 starts a process for lighting the light sources 110A and 110B, otherwise cancels the process.

If the measured values of the input voltages V1A and V1B each are within the operational range in determination processes of the Steps S16 and S17 (i.e., the Step S16: Yes, the Step S17: Yes), the microcomputer 31 starts a process for lighting both of the light sources 110A and 110B. The microcomputer 31 outputs a target voltage V41 according to the luminous flux rank of the light source 110A to the drive signal generating circuit 32A (refer to a Step S19), and further a target voltage V42 according to the luminous flux rank of the light source 110B to the drive signal generating circuit 32B (refer to a Step S20). The respective outputs of the current outputters 10A and 10B are controlled by the drive signal generating circuits 32A and 32B so that currents are supplied from the current outputters 10A and 10B to the light source units 100A and 100B, and the light sources 110A and 110B accordingly emit light.

After that, the microcomputer 31 performs a process for obtaining the measuring values of the temperatures from the temperature probes 130A and 130B, for example, every 10 msec (refer to a Step S21). Until starting the operation for reading the measuring values of the temperatures, the microcomputer 31 keeps voltage levels of the output ports PO8 and PO9 at Low-levels, so that the switch elements Q5 and Q7 are in off states, respectively. In this state, no electric power is supplied into the temperature probes 130A and 130B. Then upon the operation for reading the measuring values of the temperatures, first, the microcomputer 31 switches the voltage level of the output port PO8 to a High-level to make the switch element Q5 in an on state. At this time, the DC voltage Vcc is applied to a series circuit formed by the resistor R21 and the thermistor Rt1, and thus the analog input port AD4 of the microcomputer 31 receives a divided voltage obtained by the DC voltage Vcc being divided by the resistor R21 and the thermistor Rt1. In the on state of the switch element Q5, the microcomputer 31 subjects the divided voltage, input to the analog input port AD4, to an A/D conversion to obtain the temperature of the light source 110A from a value of the divided voltage. After obtaining the measured value of the divided voltage, the microcomputer 31 switches the voltage level of the output port PO8 to the Low-level to make the switch element Q5 in the off state. Supplying of the electric power to the thermistor Rt1 is accordingly cut off.

Next, the microcomputer 31 switches the voltage level of the output port PO9 to a High-level to make the switch element Q7 in an on state. At this time, the DC voltage Vcc is applied to a series circuit formed by the resistor R21 and the thermistor Rt2, and thus the analog input port AD4 of the microcomputer 31 receives a divided voltage obtained by the DC voltage Vcc being divided by the resistor R21 and the thermistor Rt2. In the on state of the switch element Q7, the microcomputer 31 subjects the divided voltage, input to the analog input port AD4, to an A/D conversion to obtain the temperature of the light source 110B from a value of the divided voltage. After obtaining the measured value of the divided voltage, the microcomputer 31 switches the voltage level of the output port PO9 to the Low-level to make the switch element Q7 in the off state. Supplying of the electric power to the thermistor Rt2 is accordingly cut off.

After obtaining the measuring values of the temperatures from the temperature probes 130A and 130B, the microcomputer 31 performs a process for correcting the target voltages V41 and V42, using the measuring values of the temperatures of the light sources 110A and 110B. The microcomputer 31 outputs the corrected target voltages V41 and V42 to the drive signal generating circuits 32A and 32B, so that the output currents of the current outputters 10A and 10B are corrected in accordance with the measuring values of the temperatures (refer to a Step S22).

In this way, for example, whenever 10 msec pass, the microcomputer 31 obtains the measuring values of the temperatures from the temperature probes 130A and 130B, and corrects the values of the currents to be supplied from the lighting device 1 to the light source units 100A and 100B in accordance with changes in the temperatures of the light source units 100A and 100B.

In the determination processes of the Steps S16 and S17, if the detected value of the input voltage V1A is within the operational range, but the measured value of the input voltage V1B is out of the operational range (the Step S16: Yes, the Step S17: No), the microcomputer 31 starts a process for lighting only the light source 110A.

The microcomputer 31 outputs the target voltage V41 according to the luminous flux rank of the light source 110A to the drive signal generating circuit 32A (refer to a Step S23). The output of the current outputter 10A is controlled by the drive signal generating circuit 32A so that a current is supplied from the current outputter 10A to the light source unit 100A, and the light source 110A accordingly emits light.

After that, the microcomputer 31 performs a process for obtaining the measuring value of the temperature from the temperature probe 130A, for example, every 10 msec (refer to a Step S24).

After obtaining the measuring value of the temperature from the temperature probe 130A, the microcomputer 31 performs a process for correcting the target voltage V41, using the measuring value of the temperature of the light source 110A. The microcomputer 31 then outputs the corrected target voltage V41 to the drive signal generating circuit 32A, so that the output current of the current outputter 10A is corrected in accordance with the measuring value of the temperature (refer to a Step S25). The value of the current to be supplied from the lighting device 1 to the light source unit 100A can be therefore corrected in accordance with a change in the temperature of the light source unit 100A.

In the determination processes of the Steps S16 and S18, if the measured value of the input voltage V1B is within the operational range, but the detected value of the input voltage V1A is out of the operational range (the Step S16: No, the Step S18: Yes), the microcomputer 31 starts a process for lighting only the light source 110B.

The microcomputer 31 outputs the target voltage V42 according to the luminous flux rank of the light source 110B to the drive signal generating circuit 32B (refer to a Step S26). The output of the current outputter 10B is controlled by the drive signal generating circuit 32B so that a current is supplied from the current outputter 10B to the light source unit 100B, and the light source 110B accordingly emits light.

After that, the microcomputer 31 performs a process for obtaining the measuring value of the temperature from the temperature probe 130B, for example, every 10 msec (refer to a Step S27).

After obtaining the measuring value of the temperature from the temperature probe 130B, the microcomputer 31 performs a process for correcting the target voltage V42, using the measuring value of the temperature of the light source 110B. The microcomputer 31 then outputs the corrected target voltage V42 to the drive signal generating circuit 32B, so that the output current of the current outputter 10B is corrected in accordance with the measuring value of the temperature (refer to a Step S28).

After that, for example, whenever 10 msec pass, the microcomputer 31 obtains the measuring value of the temperature from the temperature probe 130B, and corrects the value of the current to be supplied from the lighting device 1 to the light source unit 100B in accordance with a change in the temperature of the light source unit 100B.

In the determination processes of the Steps S16 and S18, if both of the measured values of the input voltages V1A and V1B are out of the operational range (the Step S16: No, the Step S18: No), the microcomputer 31 cancels a process for lighting the light sources 110A and 110B and keeps them in non-lighting states.

The microcomputer 31 does not output the target voltages V41 and V42 to the drive signal generating circuits 32A and 32B (refer to a Step S29), so that the light sources 110A and 110B are kept in the non-lighting states.

Incidentally in this Third Variation, the switch element Q2 of the load characteristic obtainer 20 is connected between the resistors R2 and R11, but it may be connected between the resistor 11 and the ground of circuit. Similarly, the switch element Q3 of the load characteristic obtainer 20 is connected between the resistors R2 and R12, but it may be connected between the resistor R12 and the ground of circuit.

In this Third Variation, the switch element Q5 of the temperature obtainer 50 is connected between the resistor R21 and the thermistor Rt1, but it may be connected between the thermistor Rt1 and the ground of circuit. Similarly, the switch element Q7 of the temperature obtainer 50 is connected between the resistor R21 and the thermistor Rt2, but it may be connected between the thermistor Rt2 and the ground of circuit.

In this Third Variation, the one lighting device 1 causes the two light source units 100 to emit light, but it may cause three or more light source units 100 to emit light. Also in this case, the load characteristic obtainer 20 may supply electric power to load information outputters 120 of the three or more light source units 100 individually, only during time periods of obtaining the load information from the load information outputters 120. The temperature obtainer 50 may also supply electric power to temperature probes 130 of the three or more light source units 100 in sequence only during time periods of obtaining the measuring values of the temperatures from the temperature probes 130.

(2. 3. 4) Fourth Variation

Figure 10:
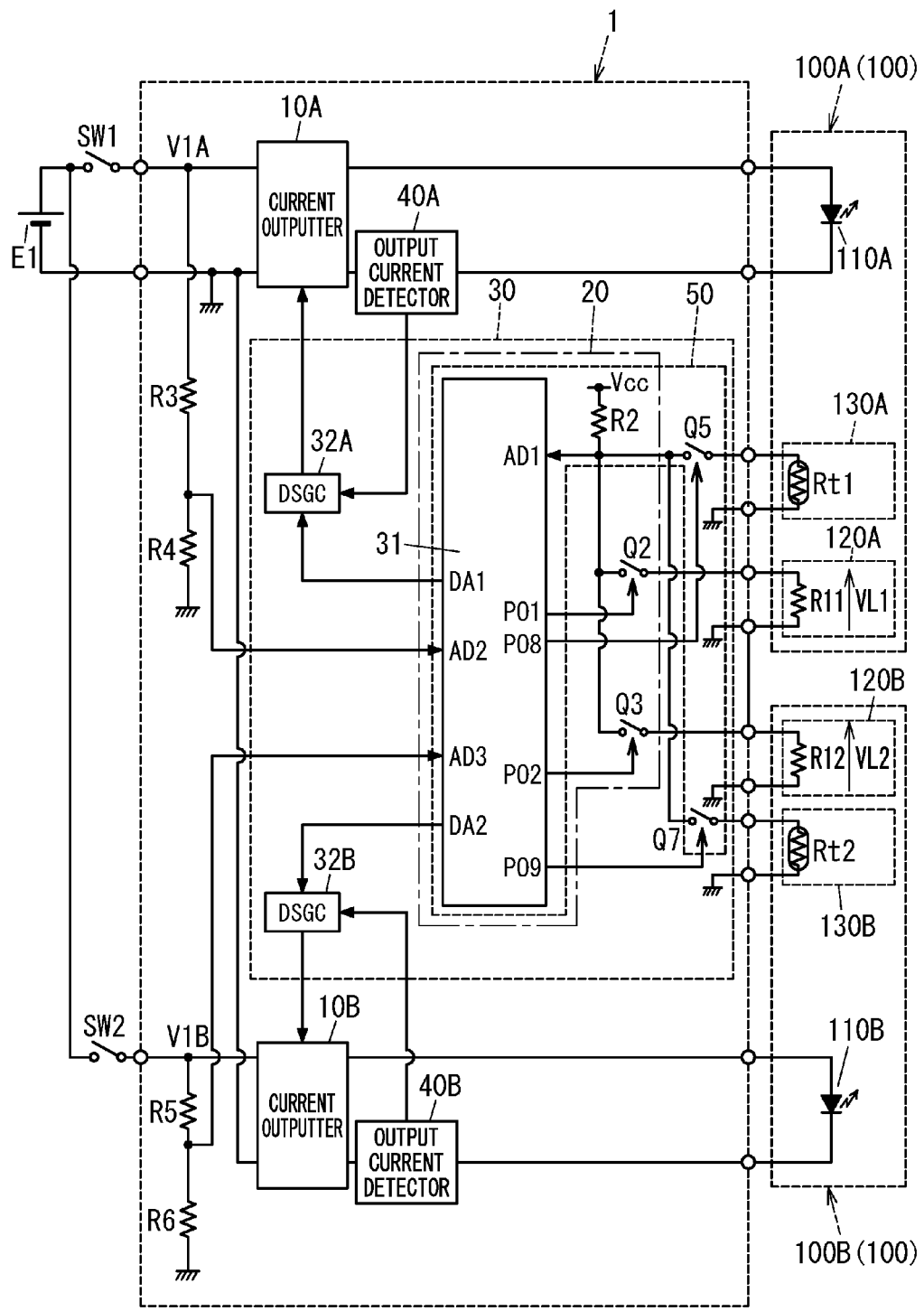
FIG. 10 is a circuit diagram of a Fourth Variation of the lighting device according to the Second Embodiment.

FIG. 10 is a circuit diagram of a lighting device 1 according to a Fourth Variation.

In this Fourth Variation, circuits of the load characteristic obtainer 20 and the temperature obtainer 50, of the lighting device 1 explained in the Third Variation of the Second Embodiment, include a common circuit element so as to share the common circuit element. Note that since components other than the load characteristic obtainer 20 and the temperature obtainer 50 are similar to those in the Third Variation, such components are denoted by same reference signs and explanations thereof are omitted.

The load characteristic obtainer 20 is constituted by a resistor R2, switch elements Q2 and Q3, and a microcomputer 31. The resistor R2 has a first end to which a DC voltage Vcc is applied, and a second end connected to first ends of the switch elements Q2 and Q3. A resistor R11 is connected between a second end of the switch element Q2 and the ground of circuit. A resistor R12 is connected between a second end of the switch element Q3 and the ground of circuit.

The temperature obtainer 50 is constituted by the resistor R2, switch elements Q5 and Q7, and the microcomputer 31. To the first end of the resistor R2, the DC voltage Vcc is applied. To the second end of the resistor R2, first ends of the switch elements Q5 and Q7 are connected. A thermistor Rt1 is connected between a second end of the switch element Q5 and the ground of circuit. A thermistor Rt2 is connected between a second end of the switch element Q7 and the ground of circuit.

The microcomputer 31 has an analog input port AD1 to which a voltage at a connecting point between the switch elements Q2, Q3, Q5 and Q7 and the resistor R2 is input.

Hereinafter, operation of the load characteristic obtainer 20 and the temperature obtainer 50 will be described.

Until starting operation for reading the load information and the temperature, the microcomputer 31 keeps voltage levels of the output ports PO1, PO2, PO8 and PO9 at Low-levels, so that the switch elements Q2, Q3, Q5 and Q7 are in off states, respectively. In this state, no electric power is supplied into the load information outputters 120A and 120B and the thermistors Rt1 and Rt2.

Upon the operation for reading the load information of the light source unit 100A, the microcomputer 31 switches the voltage level of the output port PO1 to a High-level, while keeping the voltage levels of the output ports PO2, PO8 and PO9 at the Low-levels. At this time, only the switch element Q2 is turned on, but the remaining switch elements Q3, Q5 and Q7 are kept in off, and the DC voltage Vcc is therefore applied to a series circuit formed by the resistors R2 and R11. Thus, the analog input port AD1 of the microcomputer 31 receives a divided voltage obtained by the DC voltage Vcc being divided by the resistors R2 and R11. In the on state of only the switch element Q2, the microcomputer 31 subjects the divided voltage, input to the analog input port AD1, to an A/D conversion to obtain the load information (luminous flux rank) of the light source 110A from a value of the divided voltage. After obtaining the measured value of the divided voltage, the microcomputer 31 switches the voltage level of the output port PO1 to the Low-level to make the switch element Q2 in the off state. Supplying of the electric power to the resistor R11 is accordingly cut off.

Upon the operation for reading the load information of the light source unit 100B, the microcomputer 31 switches the voltage level of the output port PO2 to a High-level, while keeping the voltage levels of the output ports PO1, PO8 and PO9 at the Low-levels. At this time, only the switch element Q3 is turned on, but the remaining switch elements Q2, Q5 and Q7 are kept in off, and the DC voltage Vcc is therefore applied to a series circuit formed by the resistors R2 and R12. Thus, the analog input port AD1 of the microcomputer 31 receives a divided voltage obtained by the DC voltage Vcc being divided by the resistors R2 and R12. In the on state of only the switch element Q3, the microcomputer 31 subjects the divided voltage, input to the analog input port AD1, to an A/D conversion to obtain the load information (luminous flux rank) of the light source 110B from a value of the divided voltage. After obtaining the measured value of the divided voltage, the microcomputer 31 switches the voltage level of the output port PO2 to the Low-level to make the switch element Q3 in the off state. Supplying of the electric power to the resistor R12 is accordingly cut off.

Upon the operation for reading the temperature of the light source unit 100A, the microcomputer 31 switches the voltage level of the output port PO8 to a High-level, while keeping the voltage levels of the output ports PO1, PO2 and PO9 at the Low-levels. At this time, only the switch element Q5 is turned on, but the remaining switch elements Q2, Q3 and Q7 are kept in off, and the DC voltage Vcc is therefore applied to a series circuit formed by the resistor R2 and the thermistor Rt1. Thus, the analog input port AD1 of the microcomputer 31 receives a divided voltage obtained by the DC voltage Vcc being divided by the resistor R2 and the thermistor Rt1. In the on state of only the switch element Q5, the microcomputer 31 subjects the divided voltage, input to the analog input port AD1, to an A/D conversion to obtain the temperature of the light source 110A from a value of the divided voltage. After obtaining the measured value of the divided voltage, the microcomputer 31 switches the voltage level of the output port PO8 to the Low-level to make the switch element Q5 in the off state. Supplying of the electric power to the thermistor Rt1 is accordingly cut off.

Upon the operation for reading the temperature of the light source unit 100B, the microcomputer 31 switches the voltage level of the output port PO9 to a High-level, while keeping the voltage levels of the output ports PO1, PO2 and PO8 at the Low-levels. At this time, only the switch element Q7 is turned on, but the remaining switch elements Q2, Q3 and Q5 are kept in off, and the DC voltage Vcc is therefore applied to a series circuit formed by the resistor R2 and the thermistor Rt2. Thus, the analog input port AD1 of the microcomputer 31 receives a divided voltage obtained by the DC voltage Vcc being divided by the resistor R2 and the thermistor Rt2. In the on state of only the switch element Q7, the microcomputer 31 subjects the divided voltage, input to the analog input port AD1, to an A/D conversion to obtain the temperature of the light source 110B from a value of the divided voltage. After obtaining the measured value of the divided voltage, the microcomputer 31 switches the voltage level of the output port PO9 to the Low-level to make the switch element Q7 in the off state. Supplying of the electric power to the thermistor Rt2 is accordingly cut off.

As above, the microcomputer 31 can obtain the load information or the measuring value of the temperature, of the light source unit 100A or 100B, by turning on any one of the switch elements Q2, Q3, Q5 and Q7.

In this Fourth Variation, particularly, the circuits of the load characteristic obtainer 20 and the temperature obtainer 50 include a common circuit element (resistor R2) so as to share the common circuit element. It is therefore possible to downsize the whole circuit of the lighting device 1. Furthermore, the number of the analog input ports of the microcomputer 31 can be reduced.

Third Embodiment

Figure 11:
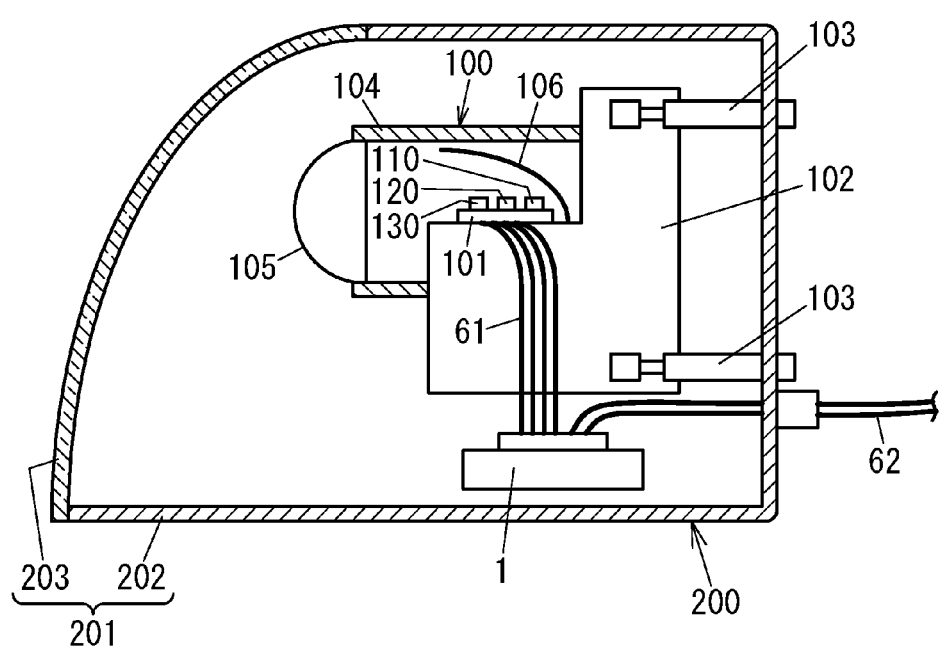
FIG. 11 is a cross-sectional view of a luminaire according to a Third Embodiment of the present disclosure.

FIG. 11 is a cross-sectional view of a luminaire 200 according to this embodiment.

The luminaire 200 according to this embodiment is, for example, a vehicle headlight device.

The luminaire 200 includes a luminaire body 201 for housing the lighting device 1 and the light source unit 100, described in the Second Embodiment.

The luminaire body 201 is constituted by a body 202 and a cover 203.

The body 202 is made of synthetic resin or metal so as to have a box-shape, which of front face has an opening.

The cover 203 is made of material, such as glass or acrylic resin, which allows light to pass through, and is to be attached to the opening of the body 202.

The light source unit 100 includes a substrate 101 on which the light source 110 is mounted. On the substrate 101, the load information outputter 120 including the resistor R10 and the temperature probe 130 including the thermistor Rt1 are also mounted.

The substrate 101 is attached to a heat radiation member 102. The heat radiation member 102 is secured to the body 202 with a support member 103, such as a screw.

The light source unit 100 further includes a lens 105 for controlling light distribution. The lens 105 is attached to the heat radiation member 102 with a support member 104. To the heat radiation member 102, a reflection member 106 is attached. The reflection member 106 reflects light emitted by the light source 110 so as to cause reflected light to enter the lens 105.

Also the body 202 houses therein the lighting device 1. The lighting device 1 and the substrate 101 of the light source unit 100 are electrically connected to each other with electric wires 61. The lighting device 1 is further connected to the DC power supply E1 with electric wires 62.

The luminaire 200 is not limited to a configuration with the lighting device 1 and the light source unit 100 described in the Second Embodiment, but may include the lighting device 1 described in any one of the First and the Second Embodiments (including variations) and the light source unit 100.

Since the luminaire 200 of this embodiment includes the lighting device 1 described in any one of the First and the Second Embodiments (including variations), it is possible to provide the luminaire 200 including the lighting device 1 which can reduce power consumption.

Note that the luminaire 200 is not limited to the vehicle headlight device, but may be a facility luminaire to be applied for a facility, such as a home, an office building or a commercial facility, or a luminaire such as a downlight.

Fourth Embodiment

Figure 12:
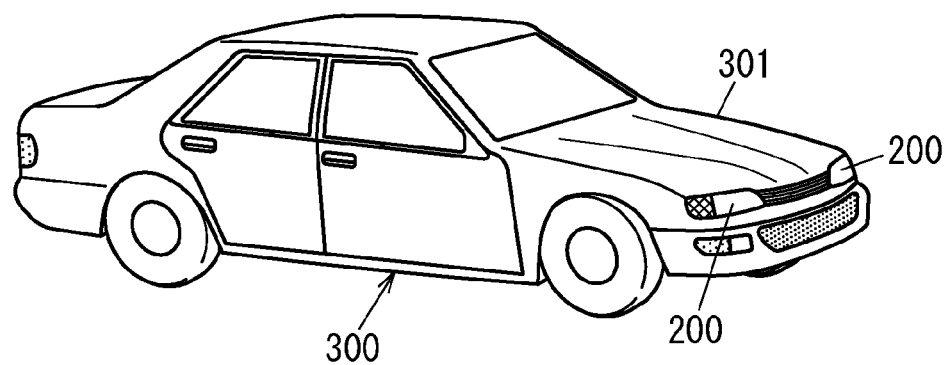
FIG. 12 is a perspective view of a vehicle according to a Fourth Embodiment of the present disclosure.

FIG. 12 is a perspective view of a vehicle 300 according to this embodiment.

The vehicle 300 is, for example, a sedan type of general automobile.

The luminaire 200 described in the Third Embodiment is disposed on each of a front right side and a front left side of a vehicle body 301 of the vehicle 300. Since the luminaire 200 includes the lighting device 1 described in any one of the First and the Second Embodiments (including variations), it is possible to provide the vehicle 300 including the lighting device 1 which can reduce power consumption.

CONCLUSION

As apparent from the above-mentioned embodiments, a lighting device (1) of a first aspect is to cause at least one light source unit (100, 100A, 100B) to emit light. Each of the at least one light source unit (100, 100A, 100B) includes a light source (110, 110A, 110B) and a corresponding load information outputter (120, 120A, 120B) for outputting load information when electric power is supplied thereto, the load information representing a luminous characteristic of the light source (110, 110A, 110B). The lighting device (1) includes at least one current outputter (10, 10A, 10B), a load characteristic obtainer (20) and a controller (30). The at least one current outputter (10, 10A, 10B) is configured to supply a current to the light source (110, 110A, 110B) of the at least one light source unit (100, 100A, 100B). The load characteristic obtainer (20) is configured to obtain the load information from the corresponding load information outputter (120, 120A, 120B) of the at least one light source unit (100, 100A, 100B), by supplying the electric power to the load information outputter (120). The controller (30) is configured to control the current (output current) of the at least one current outputter (10, 10A, 10B), which is supplied to the light source (110, 110A, 110B) of the at least one light source unit (100, 100A, 100B), based on the load information obtained by the load characteristic obtainer (20). The load characteristic obtainer (20) is configured to supply the electric power to the corresponding load information outputter (120, 120A, 120B) only during a time period of obtaining the load information, but stop supply of the electric power to the corresponding load information outputter (120, 120A, 120B) during a time period other than the time period of obtaining the load information.

According to the lighting device (1) of the first aspect, since the load characteristic obtainer (20) stops supply of the electric power to the corresponding load information outputter (120, 120A, 120B) during a time period other than the time period of obtaining the load information, the lighting device (1) can reduce power consumption, compared with a case where the electric power is continuously supplied to the corresponding load information outputter (120, 120A, 120B).

Regarding a lighting device (1) of a second aspect, in the first aspect, the at least one current outputter (10) is configured to supply the current to the light sources (110, 110A, 110B) included in a plurality of the light source units (100, 100A, 100B). The load characteristic obtainer (20) is configured to supply the electric power to the corresponding load information outputters (120, 120A, 120B) included in the plurality of the light source units (100, 100A, 100B) so as to obtain the load information from the load information outputters (120, 120A, 120B).

According to the lighting device (1) of the second aspect, even when the at least one current outputter (10) supplies the current to the light sources (110, 110A, 110B) of the plurality of the light source units (100, 100A, 100B), the controller (30) can control the current to be supplied to each of the light sources (110, 110A, 110B), based on the load information of the light source unit (100, 100A, 100B).

Regarding a lighting device (1) of a third aspect, in the second aspect, the load characteristic obtainer (20) includes a plurality of circuits configured to respectively supply the electric power to the load information outputters (120, 120A, 120B) so as to obtain the load information from the load information outputters (120, 120A, 120B). The plurality of circuits include a common circuit element so as to share the common circuit element.

According to the lighting device (1) of the third aspect, since the plurality of circuits include the common circuit element, it is possible to downsize the whole circuit of the lighting device (1).

Regarding a lighting device (1) of a fourth aspect, in the second aspect or the third aspect, the load characteristic obtainer (20) is configured to supply the electric power to the load information outputters (120, 120A, 120B) in sequence so as to obtain the load information from the load information outputters (120, 120A, 120B) in sequence.

According to the lighting device (1) of the fourth aspect, since the load characteristic obtainer (20) supplies the electric power to the load information outputters (120, 120A, 120B) in sequence, the lighting device (1) can reduce power consumption, compared with a case where the electric power is supplied to the load information outputters (120, 120A, 120B) at the same timing.

Regarding a lighting device (1) of a fifth aspect, in any one of the second to the fourth aspects, the at least one current outputter (10) includes a single current outputter (10) configured to supply the current to the light sources (110, 110A, 110B) included in the plurality of the light source units (100, 100A, 100B). The controller (30) is configured to control the current to be supplied to the light sources (110, 110A, 110B) by the single current outputter (10) to have a current value set based on the load information of the plurality of the light source units (100, 100A, 100B).

According to the lighting device (1) of the fifth aspect, when the single current outputter (10) supplies the current to the light sources (110, 110A, 110B) of the plurality of the light source units (100, 100A, 100B), the controller (30) can control the current to be supplied to the light sources (110, 110A, 110B) by the single current outputter (10), based on the load information of the plurality of the light source units (100, 100A, 100B).

Regarding a lighting device (1) of a sixth aspect, in any one of the second to the fourth aspects, the at least one current outputter (10) includes a plurality of current outputters (10, 10A, 10B) configured to supply currents to the light sources (110, 110A, 110B) included in the plurality of the light source units (100, 100A, 100B), respectively. The controller (30) is configured to control the currents to be supplied to the light sources (110, 110A, 110B) by the plurality of current outputters (10, 10A, 10B) to have current values set based on the load information of the plurality of the light source units (100, 100A, 100B), respectively.

According to the lighting device (1) of the sixth aspect, since the plurality of current outputters (10, 10A, 10B) are provided to supply the currents to the light sources (110, 110A, 110B) included in the plurality of the light source units (100, 100A, 100B), respectively, the controller (30) can control the currents to be supplied to the light sources (110, 110A, 110B) by the plurality of current outputters (10, 10A, 10B), based on the load information of the plurality of the light source units (100, 100A, 100B), respectively.

Regarding a lighting device (1) of a seventh aspect, in any one of the first to the sixth aspects, the load characteristic obtainer (20) is configured to supply, before the at least one current outputter (10) supplies the current to the light source (110, 110A, 110B) of the at least one light source unit (100, 100A, 100B), the electric power to the load information outputter (120, 120A, 120B) so as to obtain the load information from the corresponding load information outputter (120, 120A, 120B).

According to the lighting device (1) of the seventh aspect, since the output current controlled based on the load information of the at least one light source unit (100, 100A, 100B) is supplied from the current outputter (10) to the light source (110, 110A, 110B), it is possible to supply a current appropriate for the light source (110, 110A, 110B) to cause the at least one light source unit (100, 100A, 100B) to emit light.

A lighting device (1) of an eighth aspect, in any one of the first to the seventh aspects, further includes a temperature obtainer (50) configured to obtain a measuring value of a temperature from a corresponding temperature probe (130, 130A, 130B) included in the at least one light source unit (100, 100A, 100B), by supplying power to the temperature probe (130, 130A, 130B). The controller (30) is configured to control the current of the at least one current outputter (10), which is supplied to the light source (110, 110A, 110B) of the at least one light source unit (100, 100A, 100B), based on the load information and the measuring value of the temperature obtained by the temperature obtainer (50). The temperature obtainer (50) is configured to supply the power to the corresponding temperature probe (130, 130A, 130B) only during a time period of obtaining the measuring value of the temperature, but stop supply of the power to the corresponding temperature probe (130, 130A, 130B) during a time period other than the time period of obtaining the measuring value of the temperature.

According to the lighting device (1) of the eighth aspect, since the temperature obtainer (50) is configured to stop supply of the power to the corresponding temperature probe (130, 130A, 130B) during a time period other than the time period of obtaining the measuring value of the temperature, the lighting device (1) can reduce power consumption, compared with a case where the electric power is continuously supplied to the corresponding temperature probe (130, 130A, 130B).

Regarding a lighting device (1) of a ninth aspect, in the eighth aspect, the at least one current outputter (10) is configured to supply the current to the light sources (110, 110A, 110B) included in a plurality of the light source units (100, 100A, 100B). The temperature obtainer (50) is configured to supply the power to the corresponding temperature probes (130, 130A, 130B) included in the plurality of the light source units (100, 100A, 100B) so as to obtain measuring values of a plurality of the temperatures from the temperature probes (130, 130A, 130B).

According to the lighting device (1) of the ninth aspect, even when the at least one current outputter (10) supplies the current to the light sources (110, 110A, 110B) of the plurality of the light source units (100, 100A, 100B), the controller (30) can control the current to be supplied to each of the light sources (110, 110A, 110B), based on the measuring values of the plurality of the temperatures obtained from the corresponding temperature probes (130, 130A, 130B) of the plurality of the light source units (100, 100A, 100B).

Regarding a lighting device (1) of a tenth aspect, in the ninth aspect, the temperature obtainer (50) includes a plurality of circuits configured to respectively supply the power to the temperature probes (130, 130A, 130B) so as to obtain the measuring values of the plurality of the temperatures from the temperature probes (130, 130A, 130B). The plurality of circuits include a common circuit element so as to share the common circuit element.

According to the lighting device (1) of the tenth aspect, since the plurality of circuits, which obtain the measuring values of the plurality of the temperatures from the temperature probes (130, 130A, 130B), include the common circuit element, it is possible to downsize the whole circuit of the lighting device (1).

Regarding a lighting device (1) of an eleventh aspect, in the ninth aspect or the tenth aspect, the temperature obtainer (50) is configured to supply the power to the temperature probes (130, 130A, 130B) in sequence so as to obtain the measuring value of the temperature from the temperature probes (130, 130A, 130B) in sequence.

According to the lighting device (1) of the eleventh aspect, since the temperature obtainer (50) supplies the power to the temperature probes (130, 130A, 130B) in sequence, the lighting device (1) can reduce power consumption, compared with a case where the electric power is supplied to the temperature probes (130, 130A, 130B) at the same timing.

Regarding a lighting device (1) of a twelfth aspect, in any one of the eighth to the eleventh aspects, the temperature obtainer (50) is configured to periodically supply, while the light source (110, 110A, 110B) included in the at least one light source unit (100, 100A, 100B) is in lighting, the power to the corresponding temperature probe (130, 130A, 130B) so as to periodically obtain the measuring value of the temperature from the temperature probe (130, 130A, 130B).

According to the lighting device (1) of the twelfth aspect, even when the temperature of the light source (110, 110A, 110B) included in the at least one light source unit (100, 100A, 100B) is changed while it is in lighting, the controller (30) can control the current to be supplied to the light source (110, 110A, 110B) based on the measuring value of the temperature, periodically obtained by the temperature obtainer (50).

Regarding a lighting device (1) of a thirteenth aspect, in the twelfth aspect, the controller (30) is configured to measure the current (output current) of the at least one current outputter (10) at a prescribed control period to perform a feedback control. A period at which the temperature obtainer (50) obtains the measuring value of the temperature is longer than the prescribed control period.

According to the lighting device (1) of the thirteenth aspect, the period of obtaining the measuring value of the temperature is set to be longer than the prescribed control period, based on an expectation that a change in the temperature of the light source (110, 110A, 110B) is slower than the control period for the feedback control. The power consumption can be therefore reduced without deteriorating responsiveness.

Regarding a lighting device (1) of a fourteenth aspect, in any one of the eighth to the thirteenth aspects, circuits respectively constituting the temperature obtainer (50) and the load characteristic obtainer (20) include a common circuit element so as to share the common circuit element.

According to the lighting device (1) of the fourteenth aspect, since the circuits respectively constituting the temperature obtainer (50) and the load characteristic obtainer (20) include the common circuit element, it is possible to downsize the whole circuit of the lighting device (1).

A luminaire (200) of a fifteenth aspect includes the lighting device (1) according to any one of the first to the fourteenth aspects and a luminaire body (201) holding the lighting device (1).

According to this, it is possible to provide the luminaire (200) including the lighting device (1), which can reduce power consumption.

A vehicle (300) of a sixteenth aspect includes the luminaire (200) according to the fifteenth aspect and a vehicle body (301) to which the luminaire (200) is attached.

According to this, it is possible to provide the vehicle (300) including the lighting device (1), which can reduce power consumption.

A lighting method for a lighting device (1), of a seventeenth aspect, is to cause at least one light source unit (100, 100A, 100B) to emit light. Each of the at least one light source unit (100, 100A, 100B) includes a light source (110, 110A, 110B) and a corresponding load information outputter (120, 120A, 120B) for outputting load information when electric power is supplied thereto. The load information represents a luminous characteristic of the light source (110, 110A, 110B). The lighting method includes: supplying a current to the light source (110, 110A, 110B) of the at least one light source unit (100, 100A, 100B); obtaining the load information from the corresponding load information outputter (120, 120A, 120B) of the at least one light source unit (100, 100A, 100B), by supplying the electric power to the load information outputter (120, 120A, 120B); controlling the current of at least one current outputter (10, 10A, 10B), which is supplied to the light source (110, 110A, 110B) of the at least one light source unit (100, 100A, 100B), based on the load information obtained; and supplying the electric power to the corresponding load information outputter (120, 120A, 120B) only during a time period of obtaining the load information, but stopping supply of the electric power to the corresponding load information outputter (120, 120A, 120B) during a time period other than the time period of obtaining the load information.

According to the lighting method of the seventeenth aspect, it is possible to reduce power consumption.

A lighting device (1) of an eighteenth aspect is to cause at least one light source unit (100, 100A, 100B) to emit light. Each of the at least one light source unit (100, 100A, 100B) includes a light source (110, 110A, 110B) and a corresponding temperature probe (130, 130A, 130B). The lighting device (1) includes at least one current outputter (10, 10A, 10B), a temperature obtainer (50) and a controller (30). The at least one current outputter (10, 10A, 10B) is configured to supply a current to the light source (110, 110A, 110B) of the at least one light source unit (100, 100A, 100B). The temperature obtainer (50) is configured to obtain a measuring value of a temperature from the corresponding temperature probe (130, 130A, 130B), by supplying power to the temperature probe (130, 130A, 130B). The controller (30) is configured to control the current of the at least one current outputter (10), which is supplied to the light source (110, 110A, 110B) of the at least one light source unit (100, 100A, 100B), based on the measuring value of the temperature obtained by the temperature obtainer (50). The temperature obtainer (50) is configured to supply the power to the corresponding temperature probe (130, 130A, 130B) only during a time period of obtaining the measuring value of the temperature, but stop supply of the power to the corresponding temperature probe (130, 130A, 130B) during a time period other than the time period of obtaining the measuring value of the temperature.

According to the lighting device (1) of the eighteenth aspect, it is possible to reduce power consumption.

Regarding a lighting device (1) of a nineteenth aspect, in any one of the first to the fourteenth aspects, the electric power supplied to the corresponding load information outputter (120) by the load characteristic obtainer (20) is a current in a range from 100 µA to 10 mA.

Regarding a lighting device (1) of a twentieth aspect, in the nineteenth aspect, the current is in a range from 1 mA to 10 mA.

Regarding a lighting device (1) of a twenty-first aspect, in any one of the first to the fourteenth aspects, the corresponding load information outputter (120) includes a resistor (R10, R11, R12).

Regarding a lighting device (1) of a twenty-second aspect, in any one of the first to the fourteenth aspects, the corresponding load information outputter (120) includes a memory.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. A lighting device for causing at least one light source unit to emit light, each of the at least one light source unit including a light source and a corresponding load information outputter for outputting load information when electric power is supplied thereto, the load information representing a luminous characteristic of the light source, and the lighting device comprising:
   at least one current outputter configured to supply a current to the light source of the at least one light source unit;
   a load characteristic obtainer configured to obtain the load information from the corresponding load information outputter of the at least one light source unit, by supplying the electric power to the load information outputter; and
   a controller configured to control the current of the at least one current outputter, which is supplied to the light source of the at least one light source unit, based on the load information obtained by the load characteristic obtainer,
   the load characteristic obtainer being configured to supply the electric power to the corresponding load information outputter only during a time period of obtaining the load information, but stop supply of the electric power to the corresponding load information outputter during a time period other than the time period of obtaining the load information.

2. The lighting device of claim 1, wherein:
   the at least one current outputter is configured to supply the current to the light sources included in a plurality of the light source units; and
   the load characteristic obtainer is configured to supply the electric power to the corresponding load information outputters included in the plurality of the light source units so as to obtain the load information from the load information outputters.

3. The lighting device of claim 2, wherein:
   the load characteristic obtainer includes a plurality of circuits configured to respectively supply the electric power to the load information outputters so as to obtain the load information from the load information outputters; and
   the plurality of circuits include a common circuit element so as to share the common circuit element.

4. The lighting device of claim 2, wherein:
   the load characteristic obtainer is configured to supply the electric power to the load information outputters in sequence so as to obtain the load information from the load information outputters in sequence.

5. The lighting device of claim 2, wherein:
   the at least one current outputter comprises a single current outputter configured to supply the current to the light sources included in the plurality of the light source units; and
   the controller is configured to control the current to be supplied to the light sources by the single current outputter to have a current value set based on the load information of the plurality of the light source units.

6. The lighting device of claim 2, wherein:
   the at least one current outputter comprises a plurality of current outputters configured to supply currents to the light sources included in the plurality of the light source units, respectively; and
   the controller is configured to control the currents to be supplied to the light sources by the plurality of current outputters to have current values set based on the load information of the plurality of the light source units, respectively.

7. The lighting device of claim 1, wherein:
   the load characteristic obtainer is configured to supply, before the at least one current outputter supplies the current to the light source of the at least one light source unit, the electric power to the load information outputter so as to obtain the load information from the corresponding load information outputter.

8. The lighting device of claim 1, further comprising a temperature obtainer configured to obtain a measuring value of a temperature from a corresponding temperature probe included in the at least one light source unit, by supplying power to the temperature probe, wherein:
   the controller is configured to control the current of the at least one current outputter, which is supplied to the light source of the at least one light source unit, based on the load information and the measuring value of the temperature obtained by the temperature obtainer; and
   the temperature obtainer is configured to supply the power to the corresponding temperature probe only during a time period of obtaining the measuring value of the temperature, but stop supply of the power to the corresponding temperature probe during a time period other than the time period of obtaining the measuring value of the temperature.

9. The lighting device of claim 8, wherein:
   the at least one current outputter is configured to supply the current to the light sources included in a plurality of the light source units; and
   the temperature obtainer is configured to supply the power to the corresponding temperature probes included in the plurality of the light source units so as to obtain measuring values of a plurality of the temperatures from the temperature probes.

10. The lighting device of claim 9, wherein:
    the temperature obtainer includes a plurality of circuits configured to respectively supply the power to the temperature probes so as to obtain the measuring values of the plurality of the temperatures from the temperature probes; and
    the plurality of circuits include a common circuit element so as to share the common circuit element.

11. The lighting device of claim 9, wherein:
    the temperature obtainer is configured to supply the power to the temperature probes in sequence so as to obtain the measuring value of the temperature from the temperature probes in sequence.

12. The lighting device of claim 8, wherein:
    the temperature obtainer is configured to periodically supply, while the light source included in the at least one light source unit is in lighting, the power to the corresponding temperature probe so as to periodically obtain the measuring value of the temperature from the temperature probe.

13. The lighting device of claim 12, wherein:
    the controller is configured to measure the current of the at least one current outputter at a prescribed control period to perform a feedback control; and
    a period at which the temperature obtainer obtains the measuring value of the temperature is longer than the prescribed control period.

14. The lighting device of claim 8 wherein:
circuits respectively constituting the temperature obtainer and the load characteristic obtainer include a common circuit element so as to share the common circuit element.

15. A luminaire, comprising:
the lighting device of claim 1; and
a luminaire body holding the lighting device.

16. A vehicle, comprising:
the luminaire of claim 15; and
a vehicle body to which the luminaire is attached.

17. A lighting method for causing at least one light source unit to emit light, each of the at least one light source unit including a light source and a corresponding load information outputter for outputting load information when electric power is supplied thereto, the load information representing a luminous characteristic of the light source, and the lighting method comprising:
supplying a current to the light source of the at least one light source unit;
obtaining the load information from the corresponding load information outputter of the at least one light source unit, by supplying the electric power to the load information outputter;
controlling the current of at least one current outputter, which is supplied to the light source of the at least one light source unit, based on the load information obtained; and
supplying the electric power to the corresponding load information outputter only during a time period of obtaining the load information, but stopping supply of the electric power to the corresponding load information outputter during a time period other than the time period of obtaining the load information.

18. A lighting device for causing at least one light source unit to emit light, each of the at least one light source unit including a light source and a corresponding temperature probe, the lighting device comprising:
at least one current outputter configured to supply a current to the light source of the at least one light source unit;
a temperature obtainer configured to obtain a measuring value of a temperature from the corresponding temperature probe, by supplying power to the temperature probe; and
a controller configured to control the current of the at least one current outputter, which is supplied to the light source of the at least one light source unit, based on the measuring value of the temperature obtained by the temperature obtainer,
the temperature obtainer being configured to supply the power to the corresponding temperature probe only during a time period of obtaining the measuring value of the temperature, but stop supply of the power to the corresponding temperature probe during a time period other than the time period of obtaining the measuring value of the temperature.

* * * * *